United States Patent
Guido-Clark et al.

(10) Patent No.: US 10,740,930 B2
(45) Date of Patent: Aug. 11, 2020

(54) SYSTEMS AND METHODS FOR COLOR SELECTION AND AUDITING

(71) Applicant: Love Good Color LLC, Berkeley, CA (US)

(72) Inventors: Laura Guido-Clark, Berkeley, CA (US); Patrick Harrington, Boulder, CO (US)

(73) Assignee: Love Good Color LLC, Berkeley, CA (US)

( * ) Notice: Subject to any disclaimer, the term of this patent is extended or adjusted under 35 U.S.C. 154(b) by 0 days.

(21) Appl. No.: 16/183,060

(22) Filed: Nov. 7, 2018

(65) Prior Publication Data

US 2020/0143570 A1 May 7, 2020

(51) Int. Cl.
*G06T 11/00* (2006.01)
*G06T 7/90* (2017.01)
*G06F 40/279* (2020.01)

(52) U.S. Cl.
CPC .......... *G06T 11/001* (2013.01); *G06F 40/279* (2020.01); *G06T 7/90* (2017.01); *G06T 2207/20081* (2013.01)

(58) Field of Classification Search
None
See application file for complete search history.

(56) References Cited

U.S. PATENT DOCUMENTS

| | | |
|---|---|---|
| 4,682,956 A | 7/1987 | Krane |
| 4,815,976 A | 3/1989 | Krane |
| 4,971,561 A | 11/1990 | Krane |
| 5,254,978 A | 10/1993 | Beretta |
| 5,311,212 A | 5/1994 | Beretta |
| 5,363,318 A | 11/1994 | McCauley |

(Continued)

FOREIGN PATENT DOCUMENTS

| | | |
|---|---|---|
| CN | 107000210 | 8/2017 |
| KR | 2018-0015640 | 2/2018 |

(Continued)

OTHER PUBLICATIONS

Martinez et al., "Facial color is an efficient mechanism to visually transmit emotion", Mar. 2018, PNAS. (Year: 2018).*

(Continued)

*Primary Examiner* — Nicholas R Wilson
(74) *Attorney, Agent, or Firm* — Entralta P.C.; Justin G. Sanders; Peter D. Weinstein

(57) ABSTRACT

A system and method for providing color selection assistance and color auditing of an image. The continuous spectrum of colors can be narrowed to a subset of palettes of discrete colors, referred to as temperaments and environments, that facilitate selection of colors that provide a purposeful outcome. Each temperament/environment is associated with a plurality of different discrete colors and a plurality of different descriptive words, including but not limited to identity words and emotive words. The system and method enables the user to objectively transform a desired physiological response into a discrete set of colors from which to make a color selection where the presented colors are related to the desired physiological response or to audit an image to convert the palette of colors in the image to their associated temperaments.

13 Claims, 43 Drawing Sheets

Image2Emotive Example

- input:

- output response of multinomial neural network (top 5 emotional responses wrt their probabilities).
- [u'happiness', u'surprise', u'trust', u'anticipation', u'humility'] ['0.21896035307338782', '0.12843804501338685', '0.1204019469293522', '0.10129322651986755', '0.100905622362682']

(56) References Cited

U.S. PATENT DOCUMENTS

| | | | |
|---|---|---|---|
| 5,510,910 | A | 4/1996 | Bockman et al. |
| 5,638,117 | A | 6/1997 | Engeldrum et al. |
| 5,754,448 | A | 5/1998 | Edge et al. |
| 5,859,644 | A | 1/1999 | Stokes et al. |
| 5,883,632 | A | 3/1999 | Dillinger |
| 5,956,015 | A | 9/1999 | Hino |
| 6,108,442 | A | 8/2000 | Edge et al. |
| 6,309,117 | B1 | 10/2001 | Bunce et al. |
| 6,330,341 | B1 | 12/2001 | Macfarlane et al. |
| 6,757,428 | B1 | 6/2004 | Lin et al. |
| 6,850,252 | B1 | 2/2005 | Hoffberg |
| 6,863,534 | B1 | 3/2005 | Sadka |
| 6,893,265 | B2 | 5/2005 | Sadka |
| 6,950,109 | B2 | 9/2005 | Deering |
| 7,181,438 | B1 | 2/2007 | Szabo |
| 7,264,474 | B2 | 9/2007 | Sullivan et al. |
| 7,914,468 | B2 | 3/2011 | Shalon et al. |
| 7,980,931 | B1 | 7/2011 | Krane et al. |
| 8,275,635 | B2 | 9/2012 | Stivoric et al. |
| 2002/0045154 | A1 | 4/2002 | Wood et al. |
| 2004/0228526 | A9 | 11/2004 | Lin et al. |
| 2007/0024613 | A1 | 2/2007 | Jung et al. |
| 2007/0038559 | A1 | 2/2007 | Jung et al. |
| 2011/0125063 | A1 | 5/2011 | Shalon et al. |
| 2013/0257877 | A1 | 10/2013 | Davis |
| 2016/0330219 | A1 | 11/2016 | Hasan |
| 2017/0012581 | A1 | 1/2017 | Estes |
| 2017/0214701 | A1 | 7/2017 | Hasan |

FOREIGN PATENT DOCUMENTS

| | | |
|---|---|---|
| WO | 02/01466 | 1/2002 |
| WO | 2017/127850 | 7/2017 |

OTHER PUBLICATIONS

Ramirez et al., "Color Analysis of Facial Skin: Detection of Emotional State", CVPR 2014. (Year: 2014).*

Levitan, C.A. et al., "Cross-Cultural Color-Odor Associations", available at https://journals.plos.org/plosone/article?id=10.1371/journal.pone.0101651, published Jul. 9, 2014.

Brott, A., "Shining a Light on the Color of Pain and More", available a https://www.healthyway.com/content/shining-a-light-on-the-color-of-pain-and-more/, printed on Oct. 17, 2018.

Jaffe, E., "The Fascinating Neuroscience of Color", available at https://www.fastcompany.com/3027740/the-fascinating-neuroscience-of-color, printed on Oct. 13, 2018.

Cousins, C., "The Science Behind Color and Emotion", available at https://designshack.net/articles/graphics/the-science-behind-color-and-emotion/, printed on Oct. 13, 2018.

Szalavitz, M., Why Humans Have Color Vision, and Other Qs & As with Neuroscientist Mark Changizi, available at http://healthland.time.com/2012/07/07/why-humans-have-color-vision-and-other-qs-as-with-neuroscientist-mark-changizi/, published Jul. 6, 2012.

"Theory of Colours", Wikipedia entry available at https://en.wikipedia.org/Theor_of_Colours#Goethe's_theory, and printed on Oct. 12, 2018.

"What is Cymbolism?", available at http://www.cymbolism.com, and printed on Oct. 18, 2018.

"Canva", a graphic design tool website available at http://www.canva.com, and printed on Oct. 18, 2018.

* cited by examiner

Fig. 15
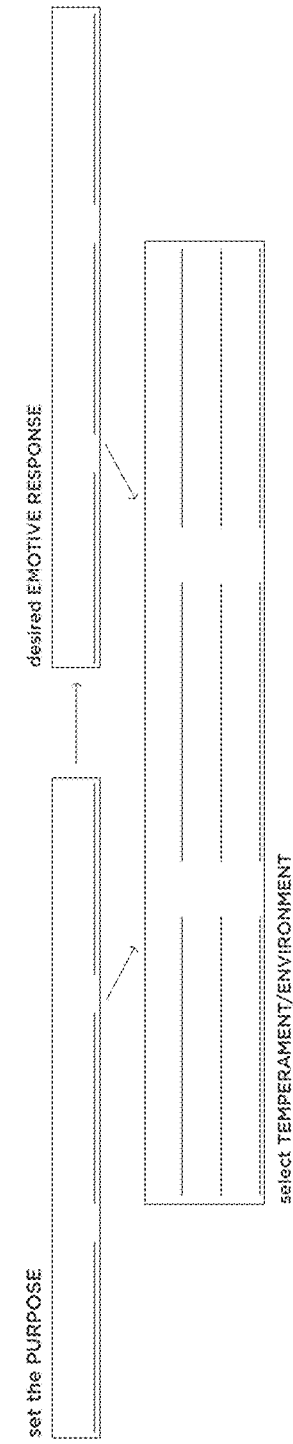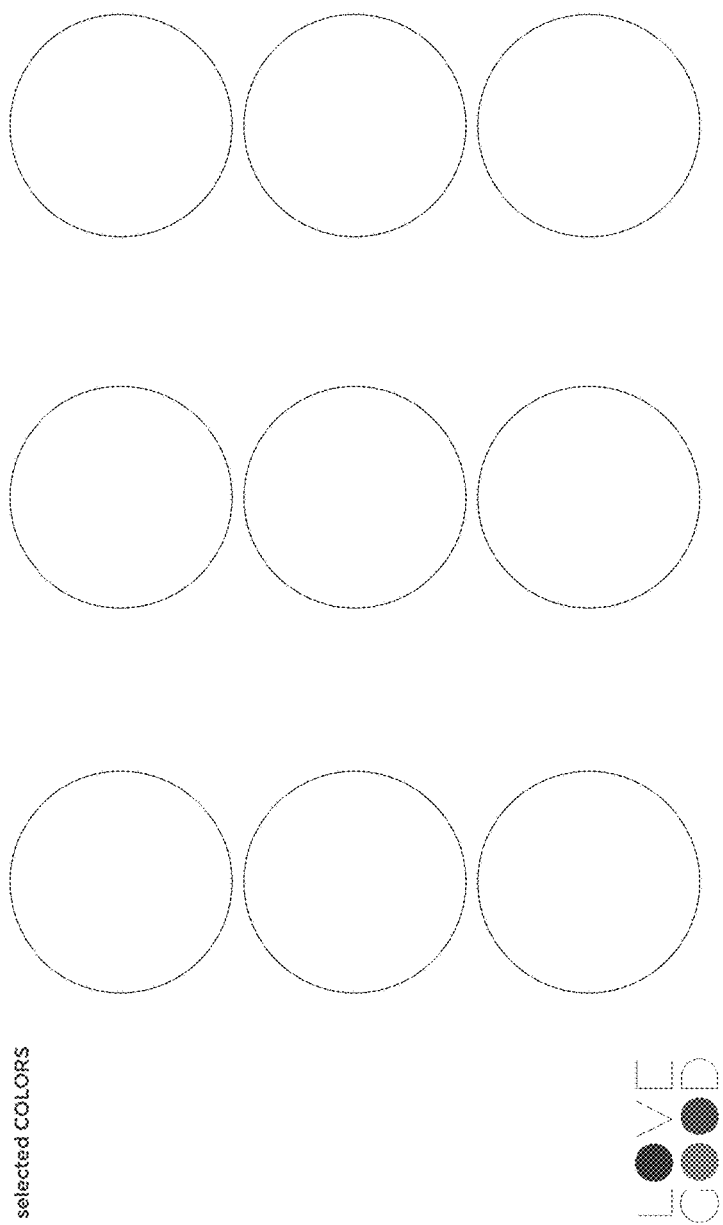

Image2Emotive Example

- input:

- output response of multinomial neural network (top 5 emotional responses wrt their probabilities).

- [u'happiness', u'surprise', u'trust', u'anticipation', u'humility'] ['0.21896035307338782', '0.12843804501338685', '0.12040194692993522', '0.10129322651986755', '0.10090562236262682']

Visual screens create a muted experience. Over time this can be brought to life through virtual reality.

Visual screens create a muted experience. Over time this can be brought to life through virtual reality.

By choosing 2 random colors and then testing harmonious colors, it illustrates that harmonious has the highest percentage of success to unify colors in combination.

Sliding bar to illustrate the quality of satiated to it's full capacity. If you do too little or too much it changes to another temperament.

Visual and auditory film evoking the depth of the deep temperament.

Visual and auditory film evoking the the experience of environments (neutral warm and neutral cool).

Fig. 36
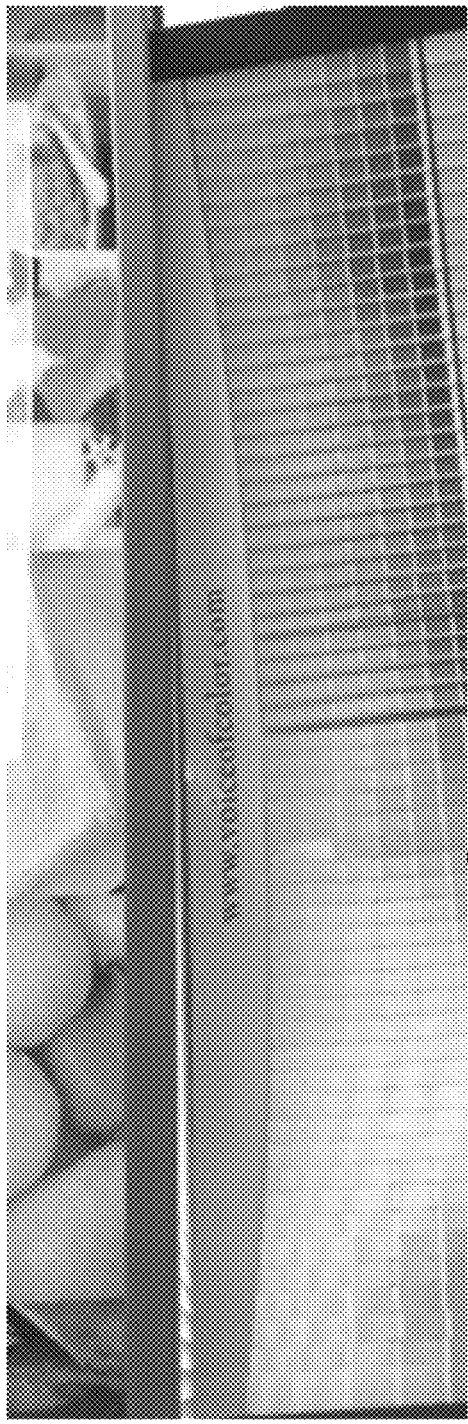
Point of sale paint selection guide
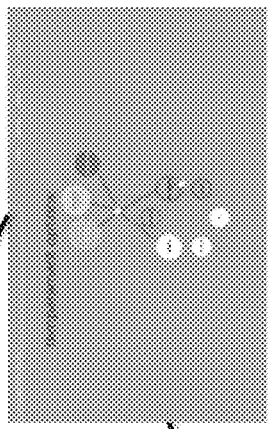
Temperaments
VR/AR

Fig. 44

Feedback Data

| Room ID | Observer ID | Hub ID | Survey Summary | Color Sensor | Intensity Sensors | Camera Surface #1 | | Camera Surface #2 | | Camera Surface #3 | |
|---|---|---|---|---|---|---|---|---|---|---|---|
| | | | | | | Color | Feedback | Color | Feedback | Color | Feedback |
| 17201 | 22 | 2 | 10 | 720 nm | 5000 lumens | PV2 | 9 | NW10 | 7 | SWG3 | 10 |
| 17201 | 76 | 2 | 9 | 712 nm | 5000 lumens | PV2 | 8 | NW10 | 7 | SWG3 | 9 |
| 17201 | 121 | 2 | 9 | 705 nm | 5545 lumens | PV2 | 8 | NW10 | 6 | SWG3 | 9 |
| 17201 | 8 | 2 | 5 | 630 nm | 6200 lumens | PV2 | 7 | NW10 | 10 | SWG3 | 8 |
| 17201 | 12 | 2 | 7 | 680 nm | 5750 lumens | PV2 | 8 | NW10 | 8 | SWG3 | 9 |
| 17201 | 17 | 2 | 8 | 710 nm | 6645 lumens | PV2 | 9 | NW10 | 7 | SWG3 | 8 |
| 17201 | 56 | 2 | 8 | 720 nm | 6387 lumens | PV2 | 9 | NW10 | 8 | SWG3 | 9 |
| 17201 | 27 | 2 | 9 | 720 nm | 5078 lumens | PV2 | 7 | NW10 | 6 | SWG3 | 8 |
| 17201 | 14 | 2 | 9 | 720 nm | 5101 lumens | PV2 | 8 | NW10 | 6 | SWG3 | 10 |
| 17201 | 96 | 2 | 8 | 720 nm | 5034 lumens | PV2 | 9 | NW10 | 7 | SWG3 | 9 |
| 17201 | 87 | 2 | 6 | 720 nm | 5000 lumens | PV2 | 9 | NW10 | 6 | SWG3 | 8 |
| 17201 | 53 | 2 | 7 | 720 nm | 5000 lumens | PV2 | 8 | NW10 | 8 | SWG3 | 9 |
| | | | Feedback Score 7.92 | 706.42 | 5478.33 | Scensory Score #1 | 8.25 | Scensory Score #2 | 7.17 | Scensory Score #3 | 8.83 |

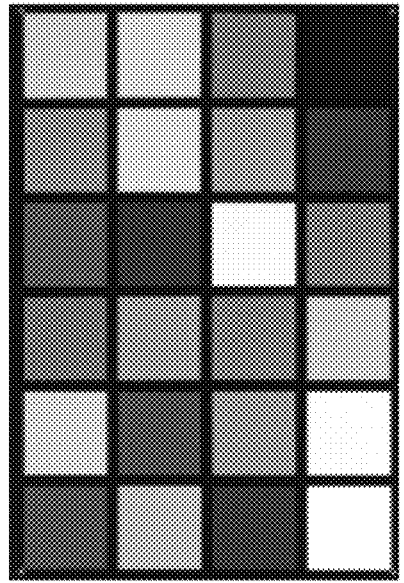
- Logs color and light shifts and intensity over time
- overSpectrum measurement with light meter with and lighting control
- Color calibration using card and light control for shifting range and span
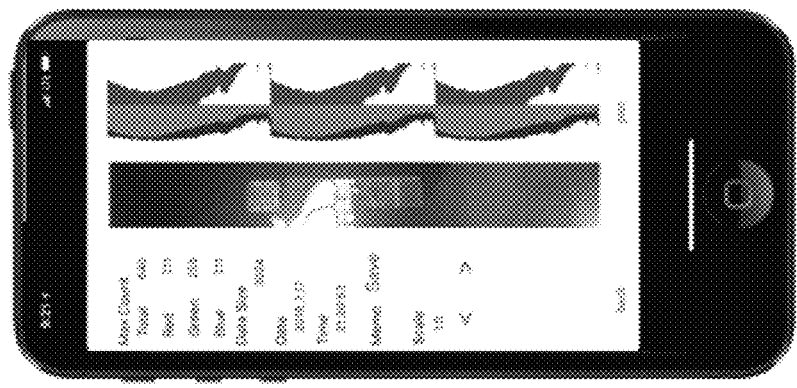
Fig. 46

SYSTEMS AND METHODS FOR COLOR SELECTION AND AUDITING

TECHNICAL FIELD

The present invention relates to systems and methods for color analysis, purposeful selection/outcome and communication.

BACKGROUND OF THE INVENTION

For a variety of reasons, people tasked with the role of choosing color make poor decisions. In turn, fear of the choice is known to cause anxiety, incorrect color selections, or indecisiveness in color selection.

Color is a major part of our lives, physiologically and psychologically. Color has a notable effect on our well-being, sometimes for the better and other times for the worse. Although there has been a significant amount of resources devoted to trying to understand color and the impact of color selection, the conventional tools, systems, and methods available to assist in color selection are incapable of creating a correlated, data-based relationship between color and predictable outcomes on one's well-being. Further, conventional color selection tools are largely subjective, limited by individual taste and trend, existing color references, and are disconnected from purposeful outcomes.

For instance, one common tool for facilitating color selection is a color wheel. A color wheel is an illustrative organization of color hues around a circle, which shows relationships between primary colors, secondary colors, and tertiary colors. Most color wheels are based on three primary colors, three secondary colors, and the six intermediate formed by mixing a primary with a secondary, known as tertiary colors. For example, a RYB color wheel has red, yellow, and blue primary colors arranged at three equally spaced points around the color wheel with secondary colors purple, orange and green located in-between. The intermediate and interior points of the color wheel represent color mixture. The center of the color wheel can be black and the colors along the radius of the wheel are referred to as shades. In other color wheels, the center can be white or gray, and the colors along the radius of the wheel are referred to as tints and tones, respectively.

These color wheels or other known color selection assistant tools are simply taxonomies of color. They do not actually assist the user in purposefully selecting a color to meet the desired outcome.

SUMMARY OF THE INVENTION

The present invention provides a system and method for color selection based on a purposeful physiological impact. The system and method include organizing discrete spectral colors into a plurality of different palettes where the discrete spectral colors for each palette are interrelated by temperament or environment, for example by statistical association. Each palette can be represented by the temperament or environment that describes the relationship among the discrete spectral colors for that palette. The system and method also includes correlating different temperaments and environments with profile or outcome data including at least one of: a) words and phrases, b) behavioral responses, c) physiological responses, and d) reported mood. The system and method includes at least one of: a) receiving and b) predicting a desired physiological response from a user, correlating the responses to color, and processing both the inputs and outputs from the dataset into a variety of applications. The system and method identifies one or more temperaments and environments based on the correlations or counter-correlations between the data and the temperaments and/or environments. The system and method, in one embodiment, provides an end-user the ability to facilitate selection of one or more colors that may provide an identity response (including, but not limited to purpose, ideas, nature, character, or culture) and/or a physiological response, such as an emotive response (including but not limited to emotional reaction or temporal feelings), the different palettes of discrete spectral colors represented by the one or more identified temperaments and environments.

Put simply, the system and method encapsulates the continuous spectrum of colors to a subset of palettes of discrete colors, referred to as temperaments and environments, that correlate to at least one of: a) a desired identity and physiological impact on people, and b) a predictive analysis of the expected physiological impact on people for a given palette. The process can be defined by a plurality of temperaments, high level emotive concepts, that associate physiological responses to colors. Each temperament is associated with a plurality of different discrete colors across the spectrum of colors. Each temperament is associated with a plurality of different responses, for example, physiological reactions described through words. The palettes of colors may then be presented to an end-user based on statistical correlation between responses and temperament/environments representing, by way of association, the palettes of discrete spectral colors. In this way, the system and method enables a plurality of uses to objectively transform a desired physiological response into a discrete set of colors from which to make a color selection where the presented colors are related to a physiological response. Likewise, the system and process may also determine an expected physiological response of an individual, through the statistical analysis of an image.

The correlations (between a physiological response, such as a set of emotive words or adjectives, and temperaments as well as between discrete colors and temperaments) can be informed by a plurality of inputs, to collect physiological evidence such as: a) response words and phrases, b) blood-pressure, c) pulse, d) neurofeedback, and e) mood observation. The system and method may include prompting users to identify a physiological response, such as identity and emotive words in response to stimuli. For developing the associations between identity and emotive words and temperaments the stimuli can be associated with a temperament or environment to solicit a physiological response. For developing associations between colors and temperaments, the stimuli can be statistically associated with a physiological response. Likewise, as such associations are created, the system and method may predict the expected physiological response from an image. The system and method may include prompting users to identify colors or a group of colors (such as a temperament) in response to stimuli. The stimuli, for example, may be a multi-sensorial experience, such as a combination of one or more visual, auditory, gustatory. tactile and olfactory cues, representative of the temperament or environment. Alternative stimuli may be a descriptive or emotive word or set of descriptive or emotive words. Direct stimuli may not always be necessary, for instance through the use of collecting language from social media profile and correlating it to the images presented. By collecting and analyzing the various responses and data from many users, correlations between physiological triggers, for instance words, and temperaments/environments can be formed and correlations between colors and temperaments/environments can be formed. These correlations are then stored as data, where machine-learning may also transform the data-set in some cases.

The correlations may also be informed by or based on a corpus of images having associated text. In one embodiment, statistical associations between descriptive and emotive words and temperaments or environments can be informed by or based on a combination of a corpus of images having associated text in conjunction with pre-determined associations between temperaments/environments and different palettes of colors. In another embodiment, the correlation between colors and temperaments/environments can be informed by or based on a combination of a corpus of images having associated text in conjunction with pre-determined associations between descriptive and emotive words and temperaments/environments.

For the embodiments that include statistical associations being informed by or based on a corpus of images having associated text, the systems and methods may include processing images from the corpus of images to statistically associate colors from the images with one or more temperaments or environments by determining similarity between colors from the images and colors from palettes of colors associated with the temperaments and environments. These systems and methods may also include processing the text associated with the images to identify descriptive and emotive words and statistically associating those descriptive and emotive words with the one or more temperaments/environments determined from processing the associated image.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 15 illustrates another embodiment of a color selection tool in accordance with the present invention.

FIG. 36 illustrates a representative view of an example point of sale paint selection guide.

FIG. 44 illustrates an example chart of feedback data.

FIG. 46 illustrates an example screenshot and associated image.

DESCRIPTION OF THE CURRENT EMBODIMENT

The present invention is generally directed to a system and method for at least one of: a) color selection or for assisting a user in making a color selection based on a desired physiological response; and b) auditing or predicting a temperament or expected physiological response from one or more images.

A physiological response can include one or more of a variety of different types of user responses. A physiological response can include an emotive response, for example where the response evokes a particular feeling in the user. A physiological response may include a physical or behavioral response. The physiological response may be a combination of a variety of different responses, for example a combination of emotive, physical, and behavioral responses. In this way, the current embodiments can at least one of: assist a user in making a color selection based on a desired physiological response or audit an image to determine its associated temperament(s), and in some embodiments provide the user with the expected physiological response of the image by way of its connection to the associated temperament(s).

Figure 1:
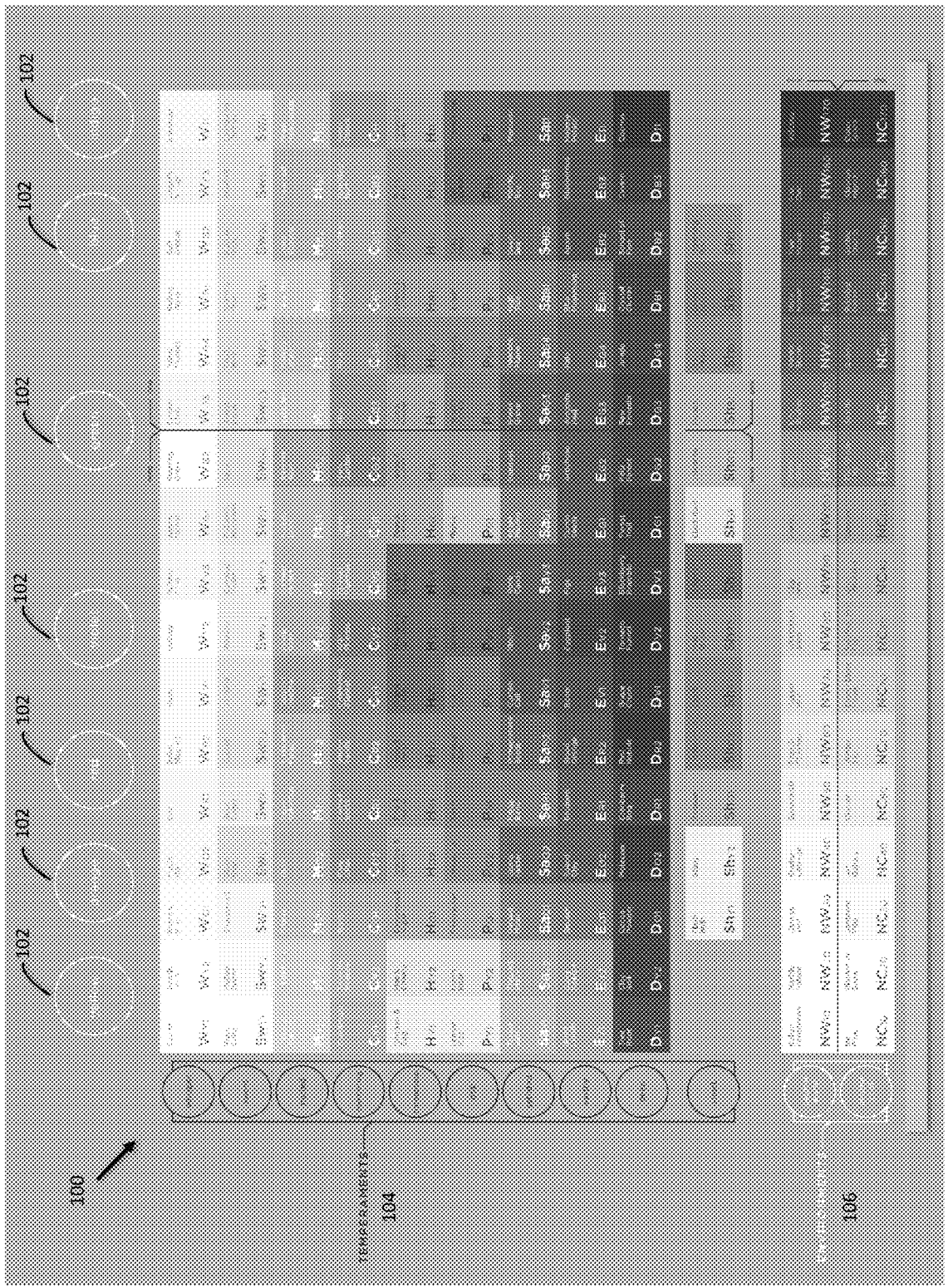
FIG. 1 shows one embodiment of a color table illustrating an organization of colors in accordance with one embodiment of the invention.

In accordance with an embodiment of the present invention, colors can be organized into a table that illustrates associations among the colors. FIGS. 1-8 illustrate one embodiment of a color table 100 and emphasize certain aspects of the color table. Referring to FIG. 1, one embodiment of a table of color that organizes color spectrally and physiologically (e.g. emotively) through temperaments 104 and environments 106 is provided. For example, a temperament 104 can be a group of colors that include similar physiological responses. An environment 106 is a palette of neutral colors that creates an infrastructure or backdrop. In the current embodiment, the environments 106 are based on neutral warm colors and neutral cool colors. The colors and organization of the color table can be selected or correlated based on statistical derivation.

Figure 2:
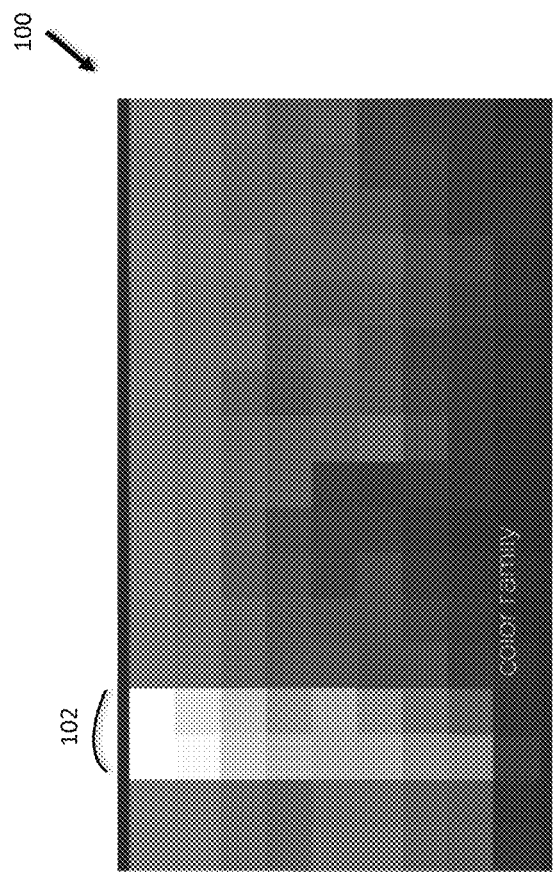
FIG. 2 shows the color table of FIG. 1 with an emphasis on a color family.

Referring to FIGS. 1 and 2 the columns of the color table are organized spectrally and can be referred to as a color group or color family 102. In the current embodiment, as indicated by the color names at the tops of the columns, the table is organized vertically by the spectral families 102 from warm to cool: Yellow (2), Orange (2), Red (2), Violet (3), Green (4), Blue, (3) Indigo (1). The number of columns designated per spectral family can be determined by a system and the number of spectral columns selected to create a holistic and complete system. Emphasis can be put on the progression of warm to cool colors. In the current embodiment, green is the exception as two of the columns are warm and two are cool. The vertical column order allows movement from warm to cool with continuous flow. As you move from left to right from yellow to violet each color in each column moves closer to the next color family with a break at violet. Green begins the process again. By organizing in a table, temperaments 104 can be emphasized that provide another sorting mechanism than just the spectral representation of the color wheel. Further, the table organization avoids a draw down method which is characterized by incremental values of light to dark in the vertical columns, further emphasizing the like properties within each temperament.

Figure 3:
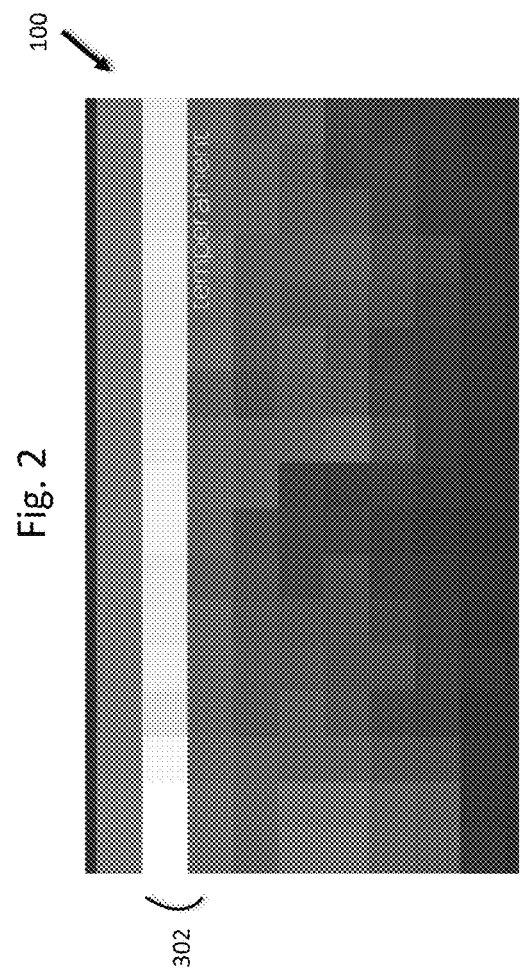
FIG. 3 shows the color table of FIG. 1 with an emphasis on the discrete colors in one temperament.

Referring to FIGS. 1 and 3, the rows of the color table can be organized by temperament 104 and environment 106, which are categories of colors with shared traits, such as physiological traits (e.g. emotions). That is, temperaments set the tone and overall mood for their individual rows or other grouping of colors. Put another way, temperaments are characteristic of a physiological response to color. Temperaments define a meaningful way to understand color goals and how to communicate them in at least one of: a) the selection and b) the analysis process. The relationships between the discrete colors in each temperament or environment can be based on a variety of different factors. For example, the relationships can be based on different multi-sensorial experiences which also can be linked to identity and physiological (e.g. emotive) response. In the current embodiment, the color table includes ten different temperaments which evoke a different multi-sensorial experience and two environments which evoke a sense of place. In this embodiment, the example temperaments include earthy, sweet, whisper, comforting, harmonious, pop, satiated, muted, deep, and shock, and the two example environments include neutral cool and neutral warm. A group of temperament or environment colors may be interrelated for a variety of reasons, for example because they are evoked by the same multi-sensorial experience or share a similar tint, tone, shade, saturation, neon proximity, coolness, or warmness.

Figure 4:
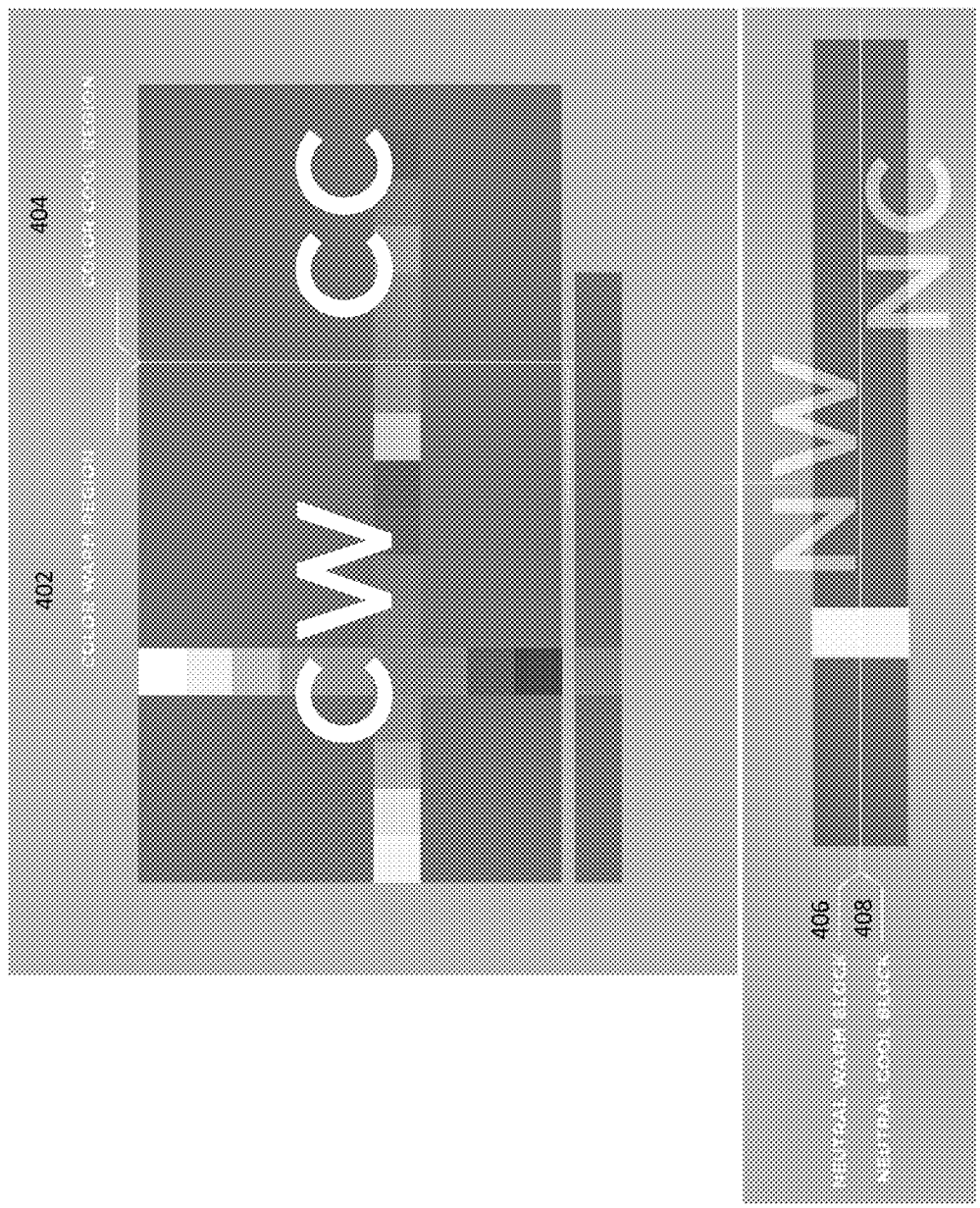
FIG. 4 shows a color table and illustrates the organizational structure of a color warm region, color cool region, neutral warm block, and neutral cool block.

Referring to FIGS. 1 and 4, the color table can be organized by color warm region and color cool region, perhaps as best shown by the divider in FIG. 4. In the current embodiment, the two environments are differentiated by the neutral warm block and neutral cool block, which are separated by a divider in FIG. 4. Color temperature can relate to colors in context to one another. In color application understanding color temperature, warm or cool, helps determine color selection and relates to identity and emotive response. In the current embodiment, the horizontal rows in the table of color are classified as environments. Environments denote a sense of place and development. Environments are neutrals because they often represent familiar backgrounds.

The number of colors in the color table can vary. The current embodiment includes about 200 colors, which enables combinations that are enough to be unique and yet not infinite and overwhelming.

Figure 8:
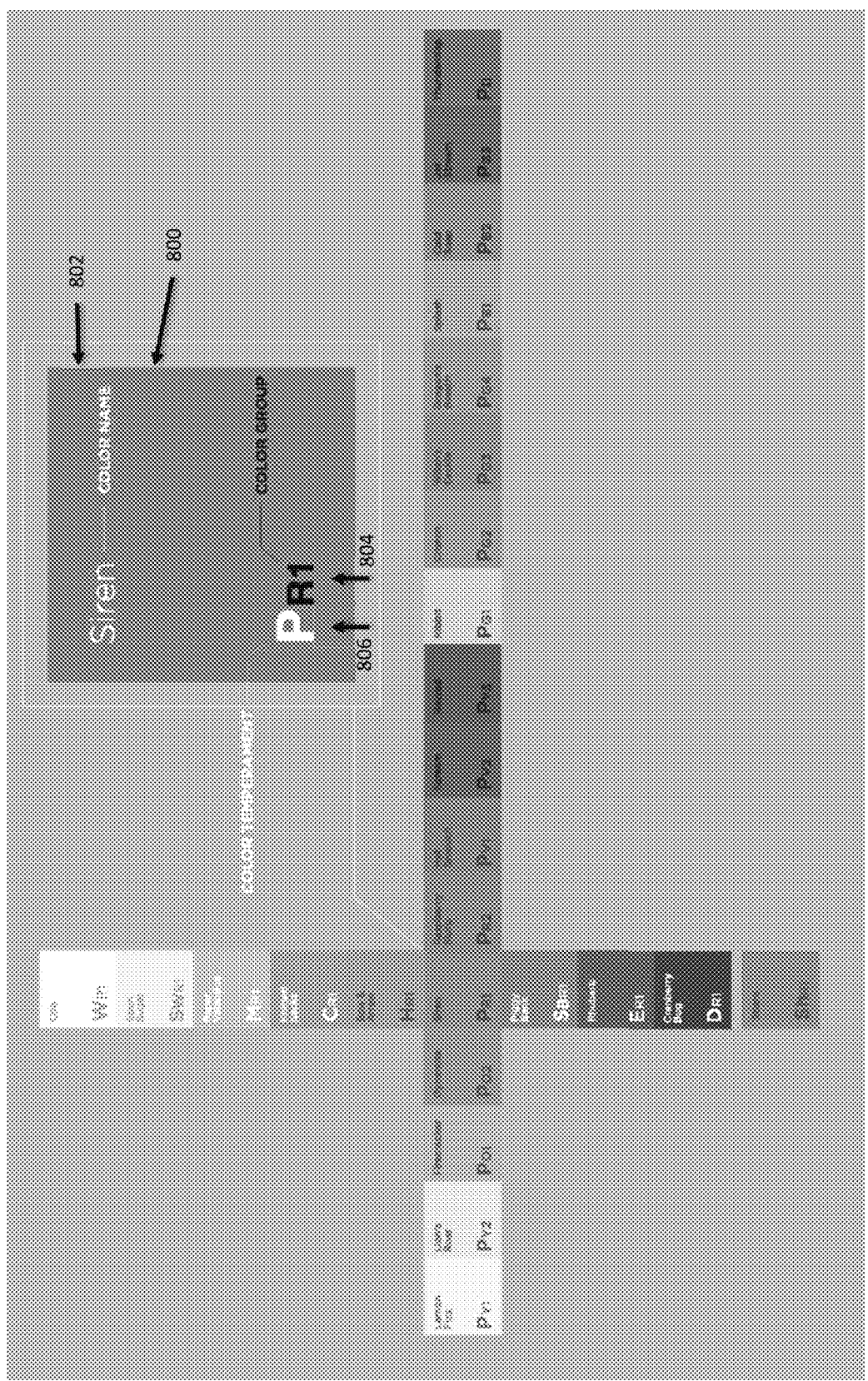
FIG. 8 illustrates the discrete colors in one example temperament and one example color group along with parts of an example color designation.

Perhaps as best shown in FIG. 8, each temperament and color group is made up of individual colors. In the color table these colors are shown by a color box or color designation 800, that includes the color name 802, color temperament letter designator 806, and the color group designator 804.

Figure 5:
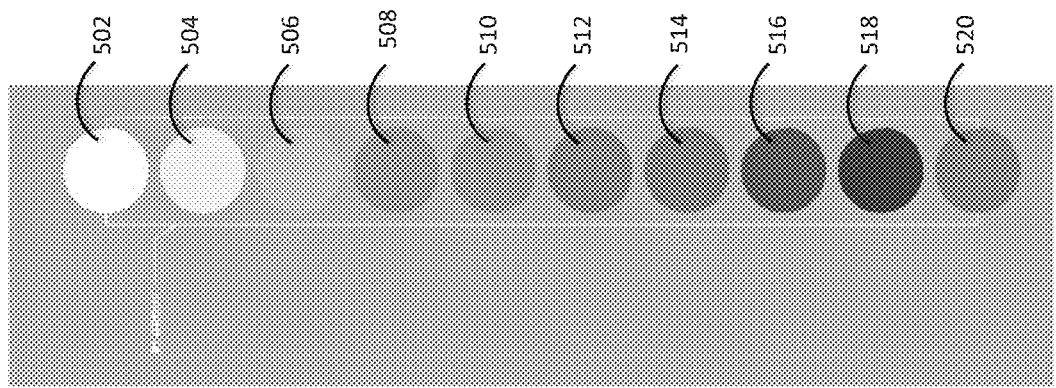
FIG. 5 illustrates the discrete colors in one example color group.

FIG. 5 illustrates the 10 colors that makeup one embodiment of a red color group, specifically the R2 color group in the current embodiment. In this embodiment, the R1 color group includes the following colors:

| FIG. 5 Reference No. | Color Name | Temperament | L*a*b* values |
|---|---|---|---|
| 502 | Ballet Slippers | Whisper | 90.06, 4.97, 6.12 |
| 504 | Sachet | Sweet | 85.38, 10.91, 3.06 |
| 506 | Weathered Fence | Muted | 71.91, 18.78, 4.37 |
| 508 | Baking Vanilla | Comforting | 58.11, 12.81, 9.74 |
| 510 | Wine & Roses | Harmonious | 56.26, 38.46, 19.72 |
| 512 | Raspberry Slurp | Pop | 50.99, 55.49, 31.63 |
| 514 | Pomegranate Seeds | Satiated | 51.29, 38.85, 14.73 |
| 516 | Blood Orange | Earthy | 40.9, 39.98, 23.56 |
| 518 | Red Nebula | Deep | 34.43, 26.41, 11.54 |
| 520 | Pink Streak | Shock | 55.35, 68.45, 27.08 |

Figure 6:
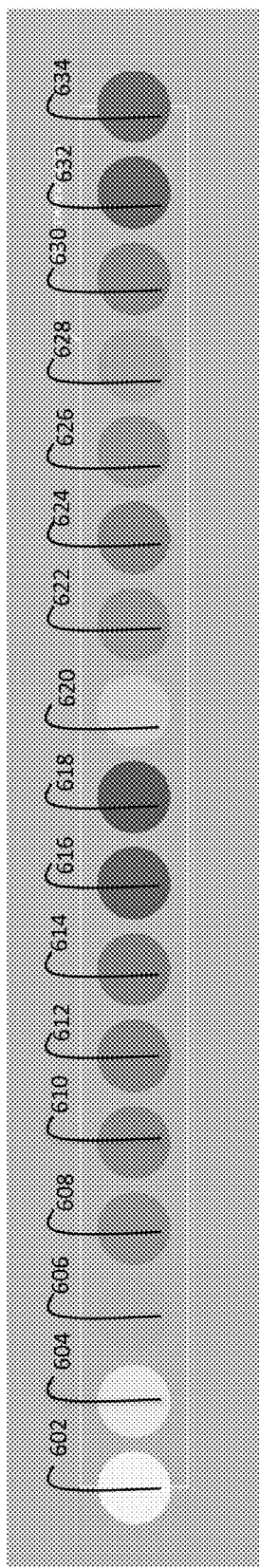
FIG. 6 illustrates the discrete colors in one example temperament.

FIG. 6 illustrates the 17 colors that makeup the pop temperament in one embodiment, the color values for these colors are shown in the following table:

| FIG. 6 Reference No. | Color Name | Color Group | L*a*b* values |
|---|---|---|---|
| 602 | Lemon Fizz | Y1 | 80.18, −1.32, 62.29 |
| 604 | Lion's Road | Y2 | 75.9, 8.14, 60.5 |
| 606 | Firecracker | O1 | 63.43, 37.58, 53.23 |
| 608 | Dynamite | O2 | 60.39, 38.39, 31.34 |
| 610 | Siren | R1 | 50.99, 55.49, 31.63 |
| 612 | Raspberry Slurp | R2 | 51.4, 46.23, −0.62 |
| 614 | Hot Smooch | V1 | 52.43, 42.62, −12.25 |
| 616 | Scream | V2 | 45.87, 40.83, −29.52 |
| 618 | Revved | V3 | 43.24, 22.89, −37.51 |
| 620 | Ribbit | G1 | 72.61, −10.3, 59.92 |
| 622 | Crunch | G2 | 54.71, −21.79, 32.12 |
| 624 | Witch's Cackle | G3 | 52.6, −32.2, 10.07 |
| 626 | Dragon's Breath | G4 | 55.44, −36.77, −4.37 |
| 628 | Splash | B1 | 62.65, −29.42, −16.63 |
| 630 | Cold Snap | B2 | 52.28, −25.19, −22.46 |
| 632 | Jet Stream | B3 | 44.74, −7.99, −35.52 |
| 634 | Thunderclap | I1 | 48.15, 7.78, −34.12 |

Figure 7:
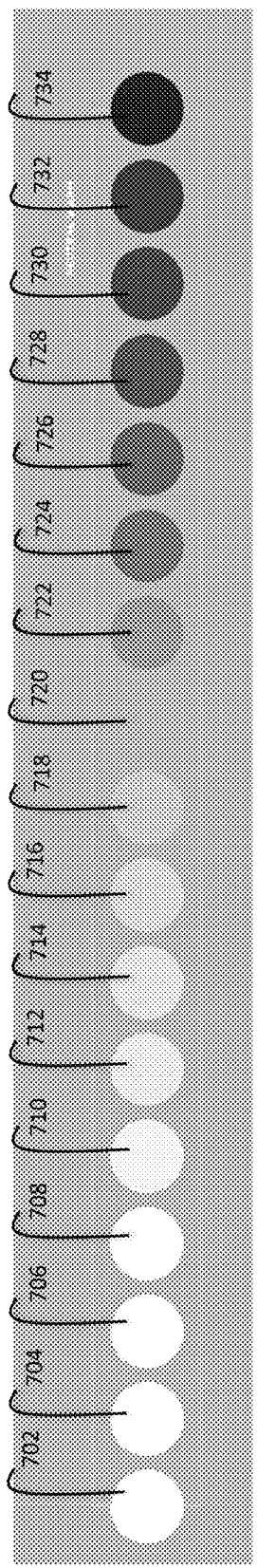
FIG. 7 illustrates the discrete colors in one example environment.

FIG. 7 illustrates the 17 neutral colors that makeup the neutral warm environment in one embodiment.

| FIG. 7 Reference No. | Color Name | Color Group | L*a*b* values |
|---|---|---|---|
| 702 | Italian Farmhouse | 10 | 96.93, −0.84, 2.52 |
| 704 | Marble Palace | 20 | 95.68, −0.26, 4.87 |
| 706 | Canvas Tent | 30 | 94.02, −1.14, 5.3 |
| 708 | English Cottage | 40 | 89.97, −1.42, 5.18 |
| 710 | Sandcastle | 50 | 85.93, −0.24, 4.2 |
| 712 | French Chateau | 60 | 82.32, −1.14, 3.69 |
| 714 | Geyser Mist | 70 | 82.79, 0.81, 3.29 |
| 716 | Weathered Shed | 80 | 78.37, 0.43, 3.93 |
| 718 | Clay Hut | 90 | 74.15, 0.8, 4.75 |
| 720 | Pueblo | 100 | 69.28, 1.0, 4.41 |
| 722 | Stone Walls | 110 | 60.46, 0.49, 3.67 |
| 724 | City Skyline | 120 | 51.45, 1.17, 1.55 |
| 726 | Pacific Storm | 130 | 47.92, 1.44, −1.83 |
| 728 | Misty Harbor | 140 | 42.08, 0.86, −0.51 |
| 730 | Tree House | 150 | 39.32, 1.27, 1.76 |
| 732 | Fox Den | 160 | 35.79, −0.14, 1.52 |
| 734 | Volcano | 170 | 30.45, 0.99, 0.1 |

The number of temperaments/environments and the basis of their interrelationships can be selected to provide a well-balanced temperament/environment outcome. That is, the number of and type of temperaments/environments can be systematically selected to provide balanced and uniform differentiation among the range of temperaments/environments. In addition, the number of discrete colors grouped within each of the temperaments/environments can be selected to provide a balanced and uniform spread within that temperament/environment. For example, each temperament may be associated with two or more colors from a set of primary and secondary colors, where each color in a group is interrelated based on a temperament/environment factor. In the current embodiment, the system and method includes 10 temperaments and two environments. In alternative embodiments, additional, different, or fewer temperaments and environments may be included.

The color table, for example the color table of FIG. 1, is a visual representation of an organization of colors in accordance with an embodiment of the present invention. The organization of colors can be accomplished in alternative ways. In one embodiment, colors are organized as colored discs into physical canisters by temperament. Each canister can include a label showing its temperament/environment and other identifying information and each of the discs are colored and can be labeled with the name, color group, and temperament of the disc color, based on the proposed system. Each temperament/environment is reflective of a specific common trait, each color within it reflective of a color relationship reflecting the temperament. For example the temperament may be Earthy, all colors within it reflective of things that exist in the earth. EY2, Curry Powder is yellow. All Earthy colors are shades, meaning colors mixed with black. In other embodiments, the organization of colors can be stored digitally in computer memory.

One aspect of the invention provides a system and method of color selection and will be described in detail in connection with FIGS. 9-14. In general, the system and method includes prompting a user to provide a set of words and then prompting the user to select one or more temperaments and or environments from the temperaments and environments provided to the user. From there, the user can select specific colors and establish a dosage of color for different zones of the product, if appropriate. The system and method is accomplished through an analog or digital interface, for example on a smart phone or computer.

Figure 9:
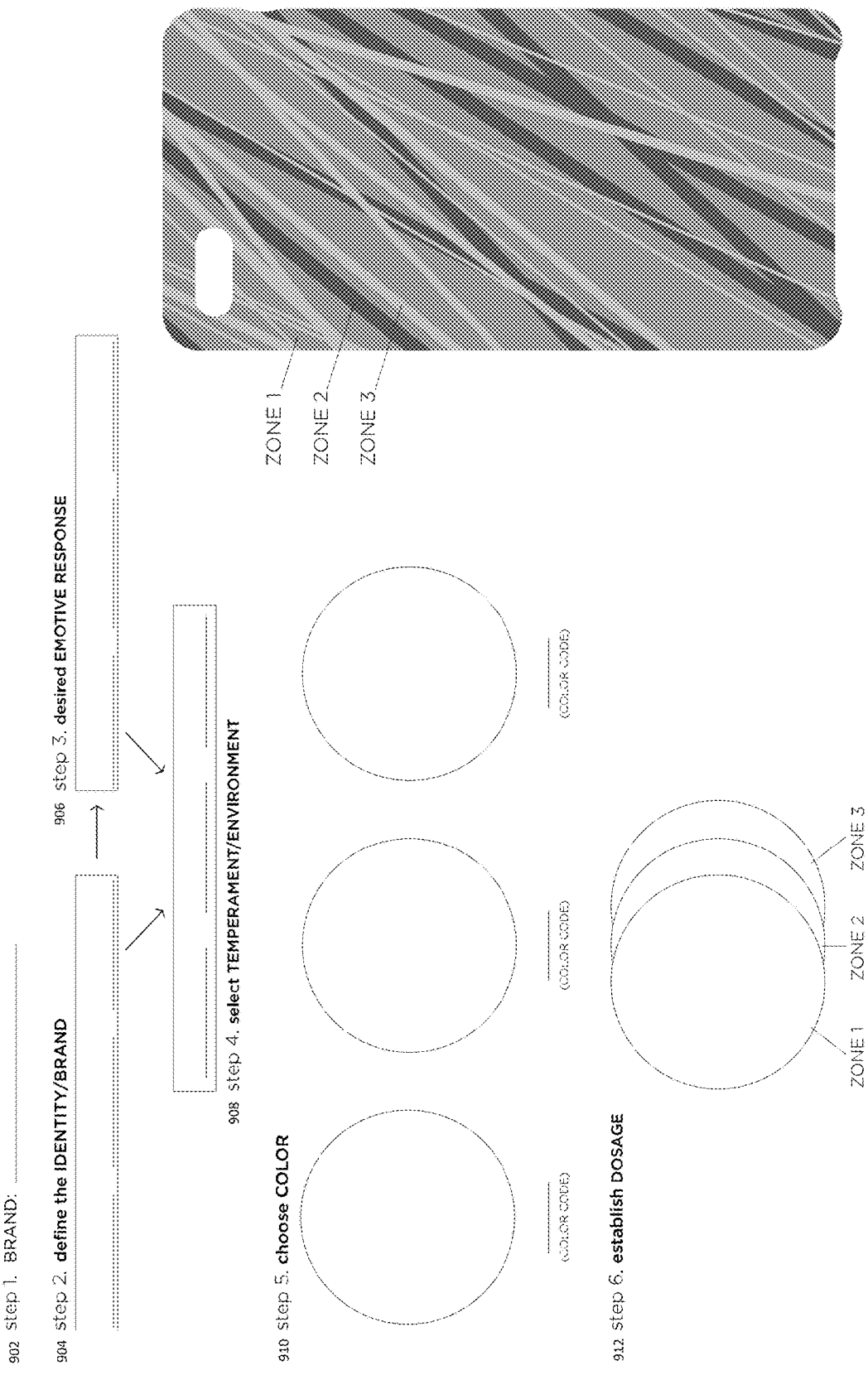
FIG. 9 illustrates one embodiment of a color selection tool of the present invention.

Referring to FIG. 9, one embodiment of a tool for color selection is illustrated. The tool provides a guide for executing six steps (902-912) of one embodiment of the system and method. Step 1, 902, prompts the user to identify the brand of the product. Step 2, 904, prompts the user to define the identity/brand by listing one, two, or three words—these are words that describe the characteristics of the brand or identity. Step 3, 906, prompts the user to define the desired emotive response of the color selection by listing one, two, or three emotive words. Step 4, 908, provides an area for recording the selected temperament/environment. Step 5, 910, provides an area for color selection and recording the specific color codes selected. Step 6, 912, provides a dosage map for dosing different zones of the product with the selected colors.

The tool can be implemented as an analog, digital, or other interactive interface that updates as the user makes selections. The product that colors are selected for can vary depending on the application. For example, the tool can assist in selection of any singular or combination of colors for a consumer electronic product, walls, floors, furniture, or any other item or environment that to which color can be applied.

Figure 10:
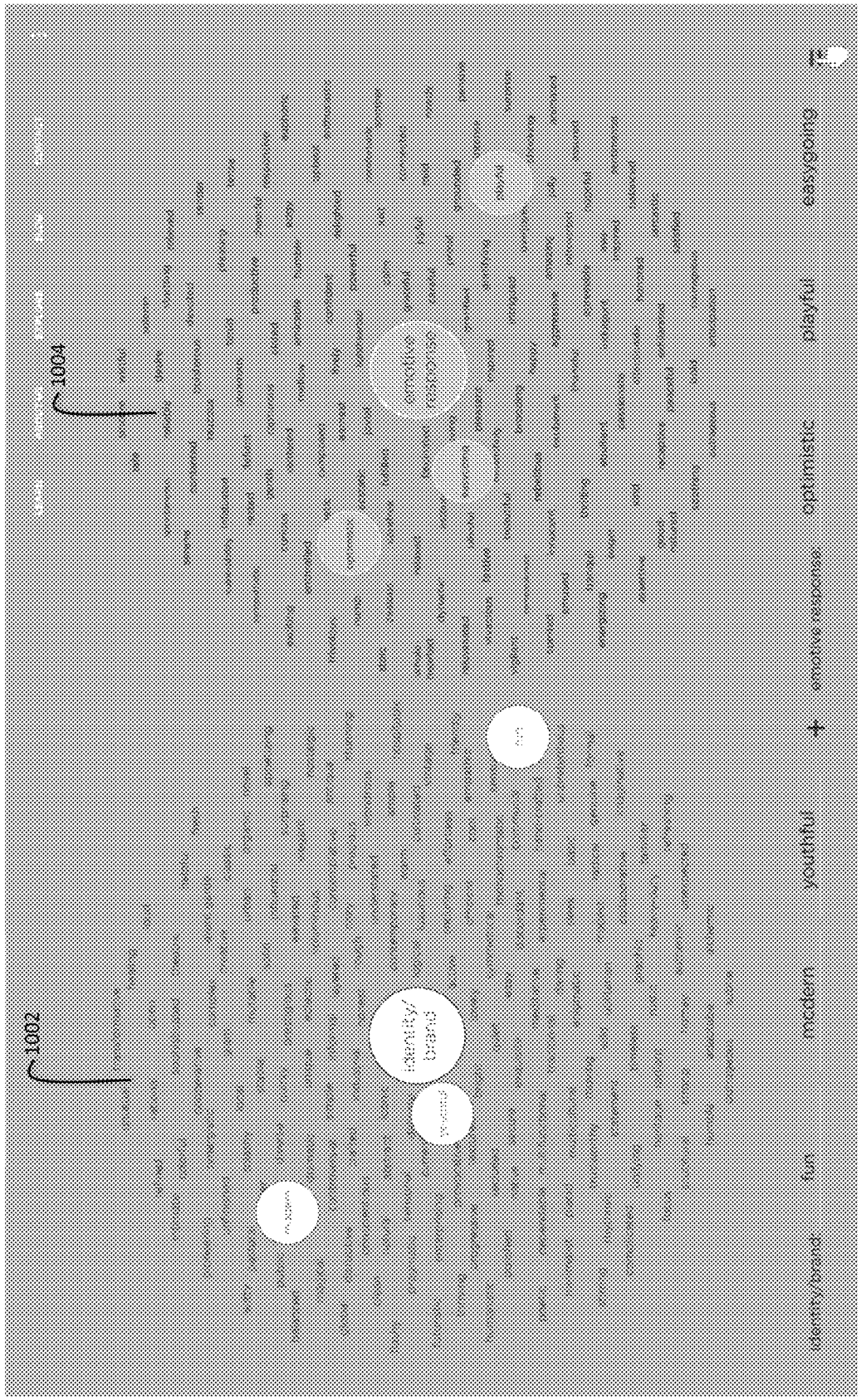
FIG. 10 illustrates representative word clouds of identity and emotive response for use in connection with one embodiment of the present invention.

A set or sets of words, that evolves based on statistical correlation and human input, and can be provided to the user for defining the identity/brand and desired emotive response. For example, FIG. 10 illustrates example word clouds for selecting identity/brand words 1002 and emotive words 1004. The word clouds can be provided to the user via at least one of: a) an analog version with pre-printed cards; and b) by computer or other digital interface that allows the user to select the words from the pre-defined list of words in the word clouds. The distinction between identity/brand and emotive response words are as follows: identity/brand words describe who you are as person/group/organization, an emotive response defines how you want people to feel when they experience the end product. In alternative embodiments, a single word cloud with both identity/brand and emotive words can be provided instead of separate word clouds. The words will be derived statistically from a corpus of images with associated text and from user selection over time.

Put another way, FIG. 10 shows a word cloud 1002, 1004 related to color and its perception seeking to relate words and expectations with colors and temperaments. A series of words is presented to give a sense of identity/brand 1002 as well as a series of words relating to an emotive response 1004. These words can be based on an algorithm that suggests temperaments and environments that reinforce the identity/brand or to solicit the desired emotive response. The words available in the word cloud can be tracked and maintained from previous data and projects. The words can be associated with one or a combination of colors. Specifically, the words can be associated with the colors that make up the temperaments and environments available for selection. In the current embodiment, FIG. 10 illustrates selection of modern, youthful, and fun as identity/brand words and optimistic, easygoing, and playful as emotive words indicative of the desired emotive response. The identity/brand words and emotive words can be provided from a database of words. In some embodiments, the database may include pre-determined statistical associations between the words and the temperaments and environments, which allow the system and method to provide a recommendation regarding temperaments and environment based on the selected words. The user or users can select the words they believe are the best representation of the identity/brand and the desired emotive response. In multi-person environments these selections can be averaged or otherwise aggregated into a general response.

Figure 14:
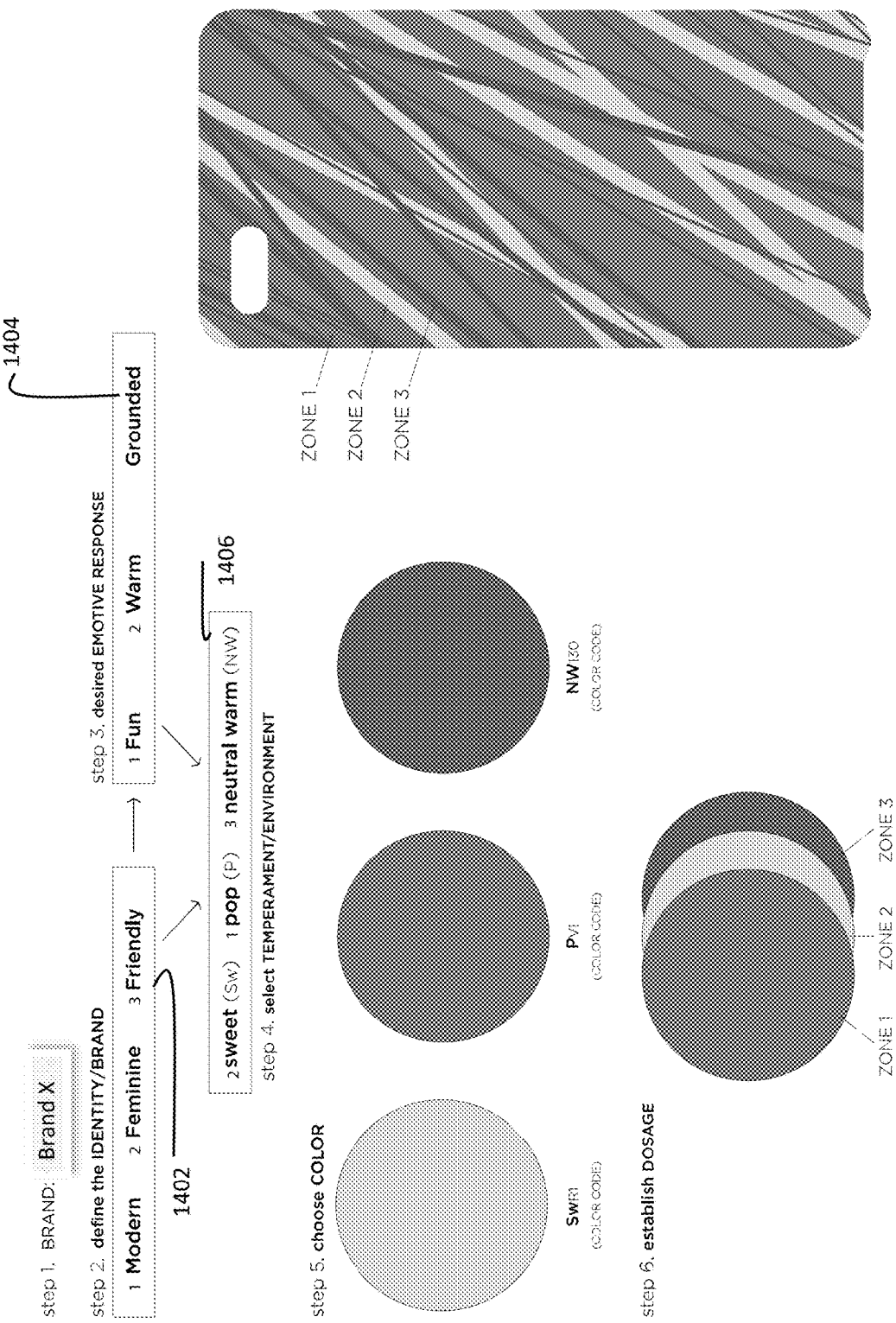
FIG. 14 illustrates the color selection tool of FIG. 9 with colors selected according to one embodiment of the system and method of the present invention.

Referring to FIG. 14, the identity/brand words and the emotive response words can be filled in to boxes 1402, 1404. For example, via an interface on a mobile application for a smart phone or tablet. Entering the desired emotive response can be done by, for example, touching the desired words that represent the intended purpose, e.g. the identity/brand words and the emotive words in the word clouds. A scroll bar may show additional words that have been characterized and linked for additional options. Further, new words can be added and associated to the words already in the database. The temperaments once selected can be filled in to box 1406.

Figure 12:
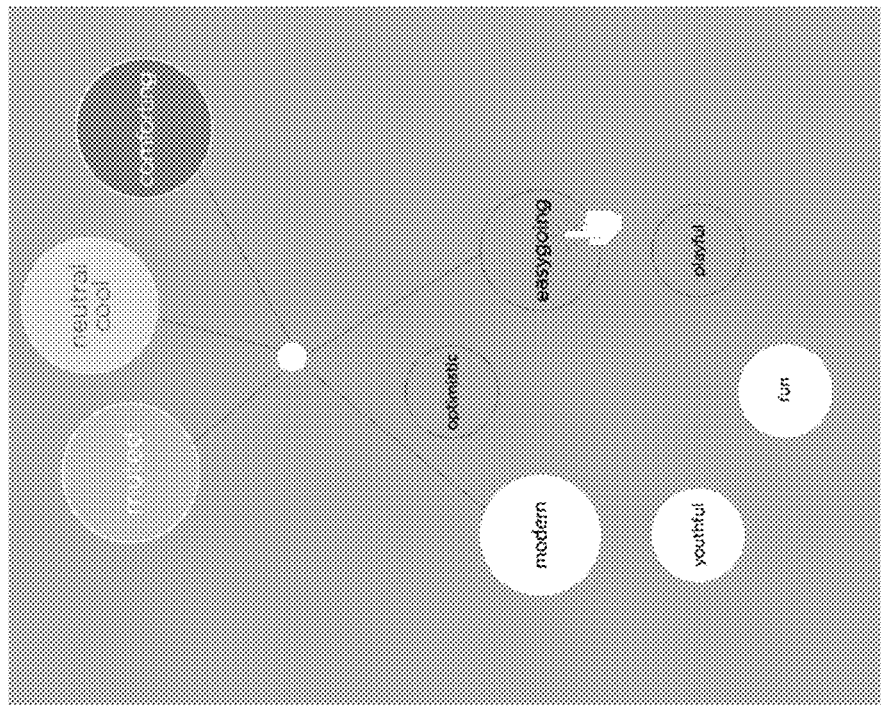
FIGS. 11 and 12 illustrate example associations between identity and emotive response word selections and temperaments and environments.
Figure 11:
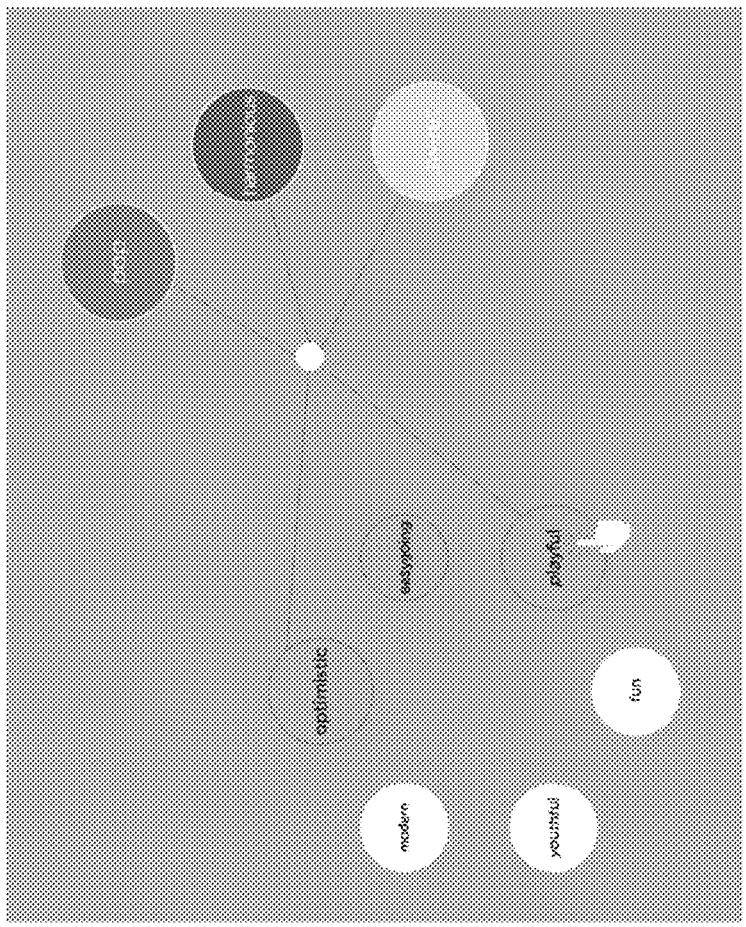

FIGS. 11 and 12 illustrate optional digital interfaces that visually depict associations between the selected words and the temperaments/environments. In one embodiment, FIGS. 11 and 12 are interactive and by clicking on a word, its suggested associations will be shown. For example, in FIG. 11 the words playful and optimistic have been clicked and therefore the associations to the temperaments of pop, harmonious and sweet are visualized in the interface. In FIG. 12, the words easygoing and modern are clicked and therefore the associations to the temperaments/environments of muted, neutral cool, and comforting are visualized in the interface. In another embodiment, FIGS. 11 and 12 represents the temperament/environment recommendations based on an algorithm. Depending on the user's word selections there are multiple temperament/environment suggestions.

FIG. 14 shows the color selection palette based on the selected temperaments selections and groupings by priority. The resultant neutrals and color blocks are referenced for additional refinement and selection. The specific colors can be selected for each color block and neutral block.

Referring to FIG. 14, once a brand has been chosen, the identity/brand has been defined, and the desired emotive response selected, then the next step is to select the temperaments and environment that reflect those words. In one embodiment, the temperaments and environment are selected by the user from among a plurality of predefined temperaments and environments provided to the user with the defined identity/brand and desired emotive response. In an alternative embodiment, a recommendation of one or more temperaments and an environment can be provided by the system and method based on the defined identity/brand and/or the desired emotive response.

Figure 13:
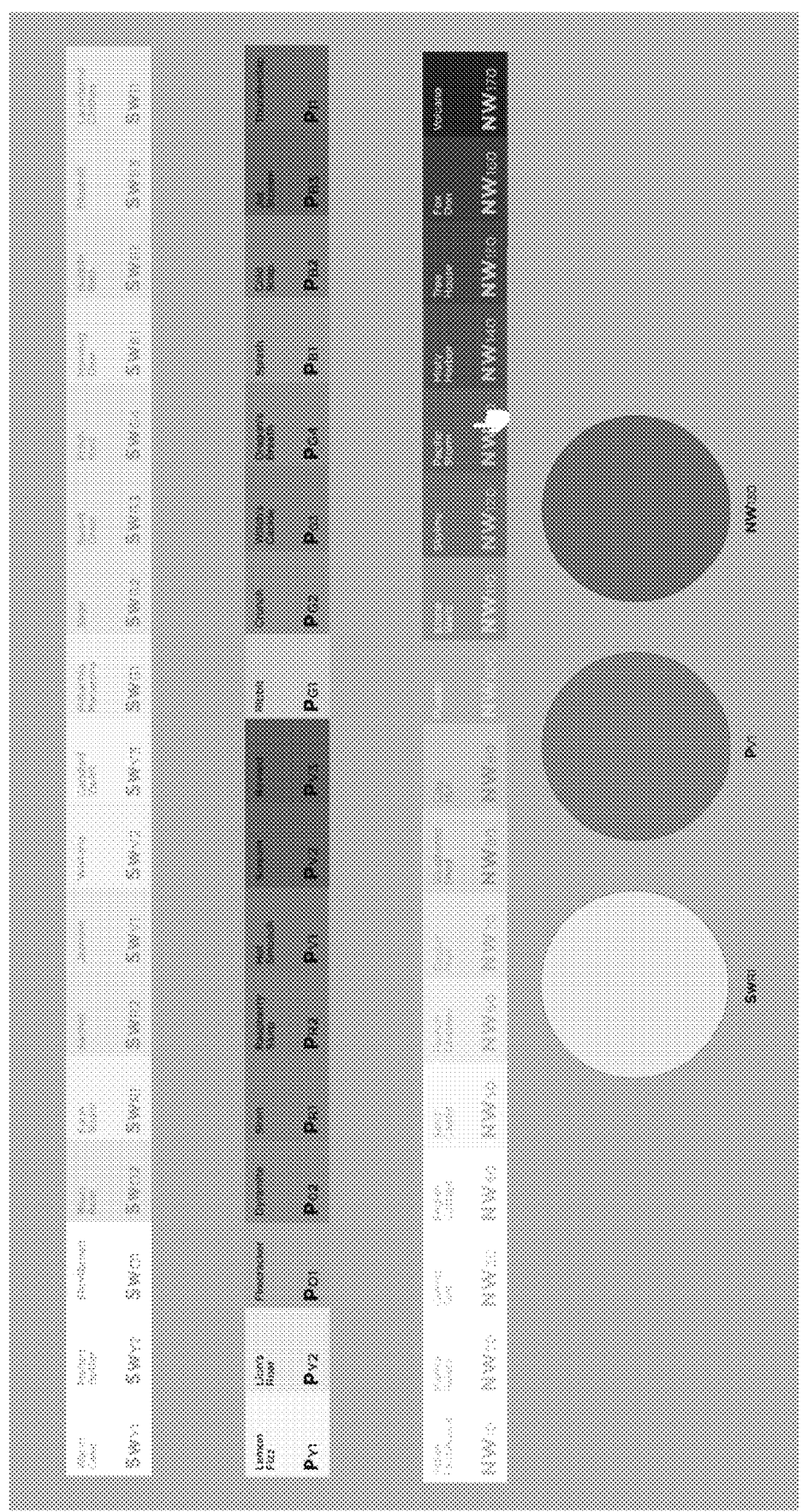
FIG. 13 illustrates two temperaments and an environment provided by one embodiment of the system and method.

FIG. 13 illustrates an example where the temperaments sweet and pop were selected and the environment neutral warm was selected. The user can be presented with the colors that are associated with each of these temperaments and environment for color selection. For example, the user can reference the color table shown in FIG. 1, canisters that include color discs, or be presented with the colors in a digital interface, such as the one shown in FIG. 13. From there, the user can select the number of colors matching the number of zones of interest for a particular product. Some products may only have one zone of which a color is being selected. Others may have two, three, four, or more different color zones for which color is being selected.

The system and method significantly narrows the number of available colors for the user to select from, for example, about 200 different colors, thus dramatically decreasing the pool of colors from which to choose. Further, these colors can have statistical associations to the identity/brand words and emotive words selected earlier in the process. These palettes are a reflection of the identity/brand and emotive response that can lead to a relevant and purposeful outcome.

Zones can be dosed according to a predefined priority. For example, the doses can be selected according to the order of the selected temperaments as the tones and volumes are related to the temperament sought and the mix thereof. That is, in the embodiment depicted in FIG. 14, the dosage is based on the prioritization of the identity/brand and emotive response words. Therefore, the dosing for zones 1, 2, and 3, are tied respectively to the temperaments/environments pop, sweet, and neutral warm, as shown in FIGS. 13 and 14.

Referring back to FIG. 14, after colors are selected and assigned to a zone, an interactive screen can depict what the product, or an uploaded image of an end product with the color dosing applied.

FIG. 15 shows another embodiment of a tool for color analysis. The depicted form requests a series of words, in this case words relating to identity/brand and a desired emotive response. Those words are used to select temperaments/environments from which the colors are selected. This alternative embodiment reflects a larger selection of color choices. The result of the tool is the same, an identity/ brand and emotive response is distilled to one or more temperaments or environments that can be used as a basis for purposeful color selection.

FIGS. 9-15 illustrate an embodiment of the invention where the statistical associations (between identity/brand and emotive words and temperaments as well as between discrete colors and temperaments) can be informed by or based on data. As described, the system and method of this embodiment includes prompting users to identify identity/brand and emotive words. The users are prompted to provide identity/brand and physiological (e.g. emotive) words that they believe relate to who you are as person/group/organization and the desired physiological response of the end product combination to which color is being selected. Having those words selected, the users can be prompted to select their own temperaments/environments, using as stimuli the physiological response the user generated. That is, the user selects a temperament/environment they believe corresponds or is associated with the selected desired physiological response. The users create a dataset, which in turn informs a machine learning system. The resulting system allows a user to perform at least one of: a) using desirable words to determine colors; and b) using an image to predict likely physiological outcomes. As discussed above, in some embodiments, instead of the user selecting a temperament/environment, a recommendation may be provided to the user based on the identity/brand and desired emotive response, based on a machine learning system that statistically associates identity/brand and emotive responses/grammar to temperaments/environments.

In one embodiment, statistical associations between colors that form a temperament or environment can be obtained by prompting a user with a sensorial experience and prompting the user with feedback about which colors that experience represents. This can be done in a plurality of ways, for example providing a short video or tutorial. With sufficient data, the correlations of what colors relate to that temperament or environment can be determined.

Correlations can be informed by at least one of; a) a corpus of images having associated text and b) survey data. In one embodiment, the statistical associations between descriptive words and temperaments or environments can be informed by or based on a combination of a corpus of images having associated text in conjunction with pre-determined associations between temperaments/environments and different palettes of colors. In another embodiment, the statistical associations between colors and temperaments/environments can be informed by or based on a combination of a corpus of images having associated text in conjunction with pre-determined associations between descriptive words and temperaments/environments. FIGS. 16-20 illustrate one embodiment of a system and method of processing a corpus of images and associated text to determine statistical associations.

Figure 16:
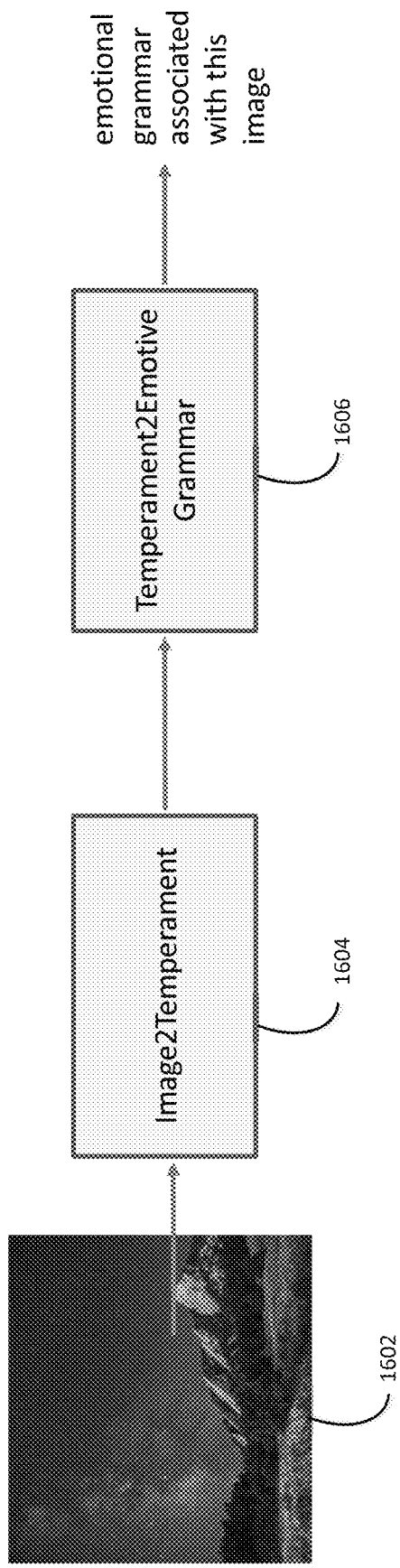
FIG. 16 illustrates a representative block diagram of an application programming interface for processing images to statistically associate them with temperaments/environments and to process the associated text to associate descriptive and emotional grammar with the image through the temperaments.

FIG. 16 shows a representative block diagram of an application programming interface that accepts images and provides the emotional grammar associated with that image. The image2emotive grammar API accepts mages 1602 as input to an image2temperament function 1604, which outputs a temperament distribution that is an input to a temperament2emotivegrammar function 1606, which outputs emotive grammar associated with an image. An image can be processed by pixel value using a function referred to as image2temparament, described in connection with FIG. 17. The flow can be reversed. That is, for example, by swapping features x for y and y for x in the algorithm in FIG. 18. Put another way, once trained, the image2emotivegrammar API returns a set of emotive words in response to an image without any associated text. Alternatively, a set of emotive words can be provided and one or more sets of colors, such as a temperaments and environments can become the output.

Figure 17:
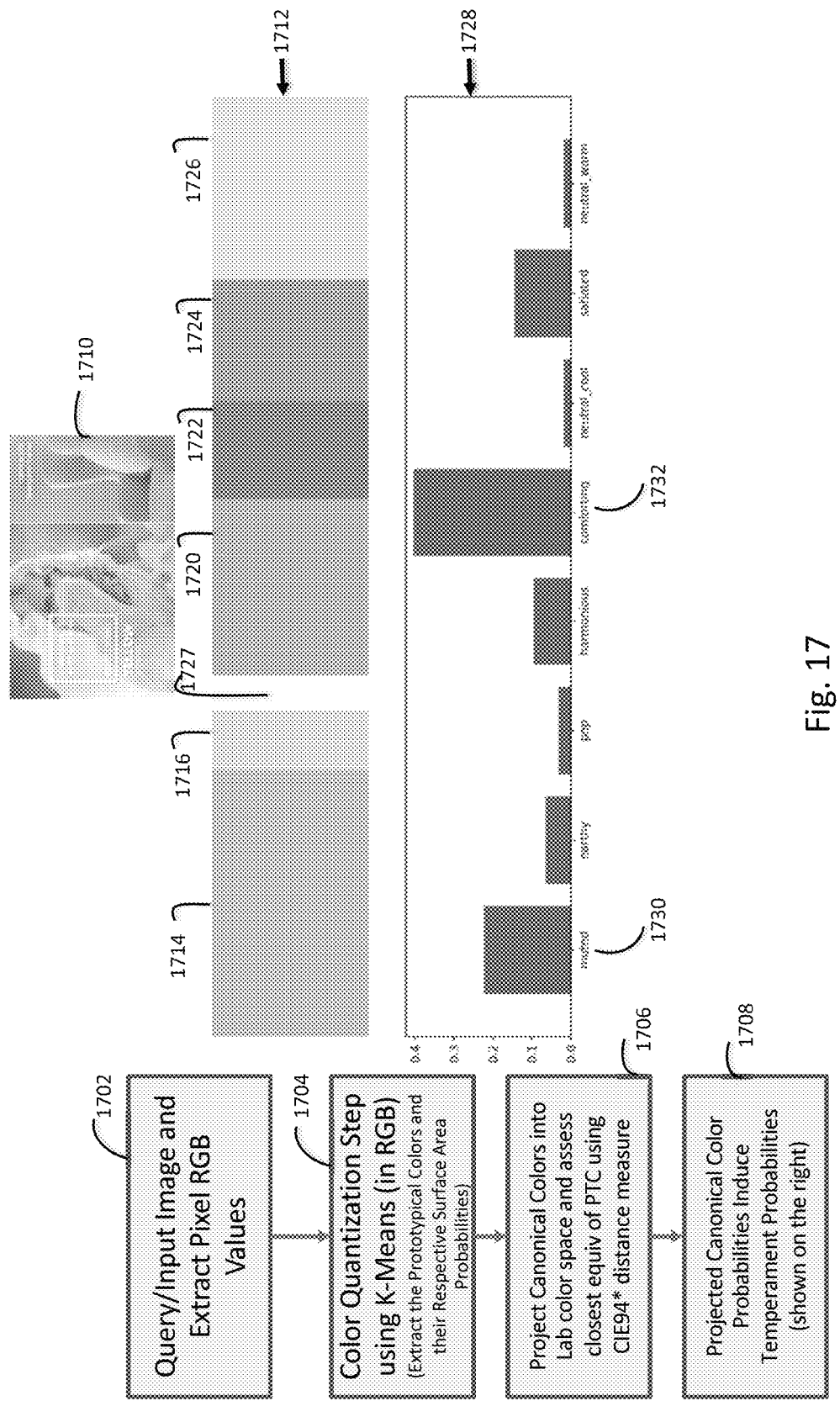
FIG. 17 provides a flow diagram and visual representation of an image to temperament probability distribution function.

FIG. 17 illustrates a flow diagram and accompanying example images of the image2temperament function. This function includes the following steps: query/input image and extract pixel RGB (red, green, blue) values 1702. That is, the input image, for example image 1710, can be broken down into its pixels and their values. The pixel values can be stored in a database or other memory structure as a vector or array. For example, the position and each pixel value can be represented in a vector or array. After the image has been vectorized, a color quantization step 1704 can be utilized to extract the prototypical colors and their respective surface area probabilities, for example using a k-means algorithm. K-means is a clustering method of vector quantization. It partitions the data into k clusters in which each point belongs to the cluster with the nearest mean, serving as a prototype of the cluster. For example, in FIG. 17, the image is quantized into 7 different colors (1714, 1716, 1727, 1720, 1722, 1724, 1726), depicted by the color graph 1712.

Next, the canonical colors can be projected into LAB color space and a distance calculation to find the closest equivalent of PTC using CIE94 distance measurement 1706. CIE94 is a color difference formula. It can be a better approximation of human perception of color closeness than L2 or Euclidean distance in RGB space. The projected canonical color probabilities induce temperament probabilities, which are shown in FIG. 17. For example, the temperament muted 1730 is associated with about 20% of the image and the comforting temperament 132 with about 40% of the image. In aggregate, the associations between colors and the temperament distribution 1728 is used to create the correlations. As the system learns more through the feedback cycle inherent to the design, those associations may change.

Figure 18:
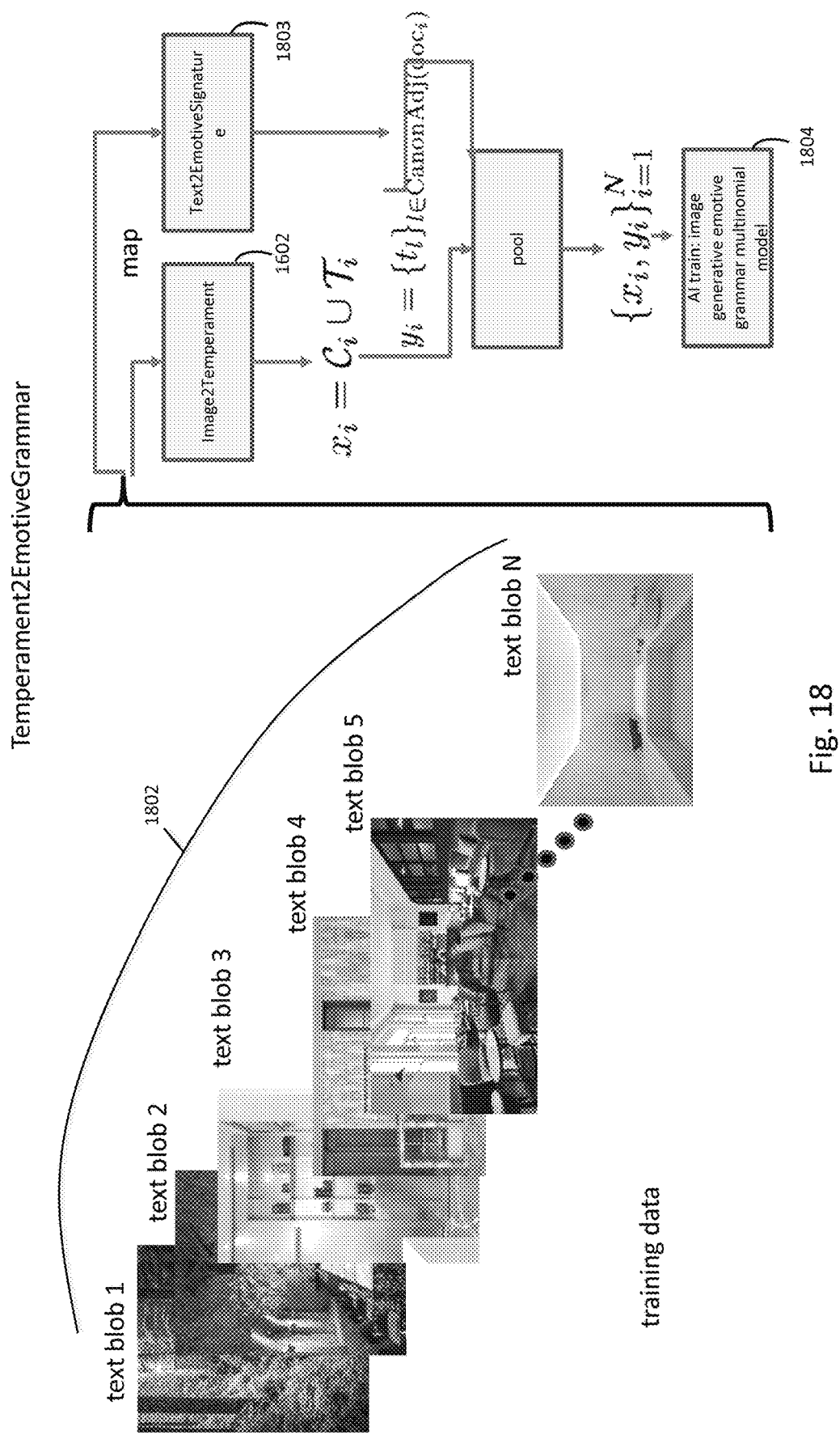
FIG. 18 illustrates a flow diagram and visual representation of the temperament to descriptive and emotive grammar function.

The next step in the overall function of image2emotivegrammar application programming interface is the temperament2emotivegrammar functionality 1606. This function is illustrated in FIG. 18. Specifically, FIG. 18 illustrates how the temperament distributions from a plurality of images from the image2temperament function 1602 are pooled with the emotive signatures resulting from a text2emotivesignature function 1803 on associated text of the image in order to train an image generative emotive grammar multinomial model 1804. Put another way, FIG. 18 illustrates how to seek a linguistic signature of emotional adjectives attached to color temperament signature.

Figure 19:
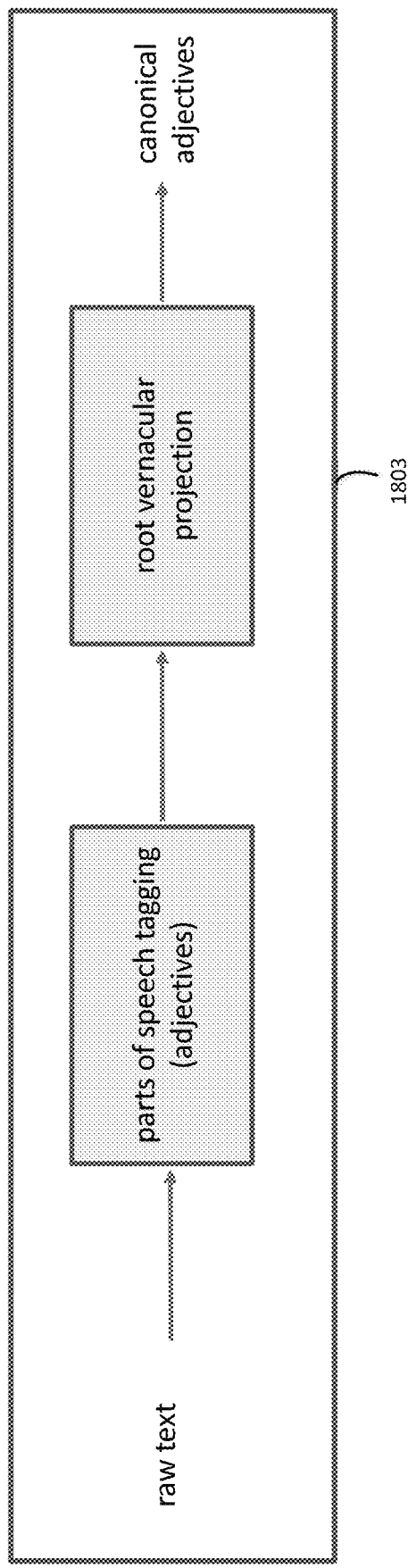
FIG. 19 illustrates a representative flow diagram of one embodiment of a text to descriptive and emotive grammar function.
Figure 20:
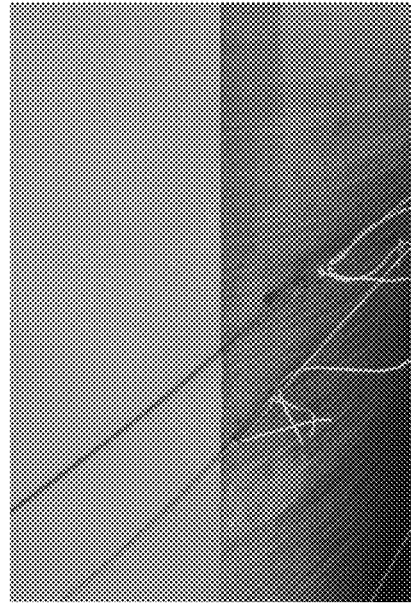
FIG. 20 illustrates a representative diagram of one embodiment of an image to emotive function.
Figure 21:
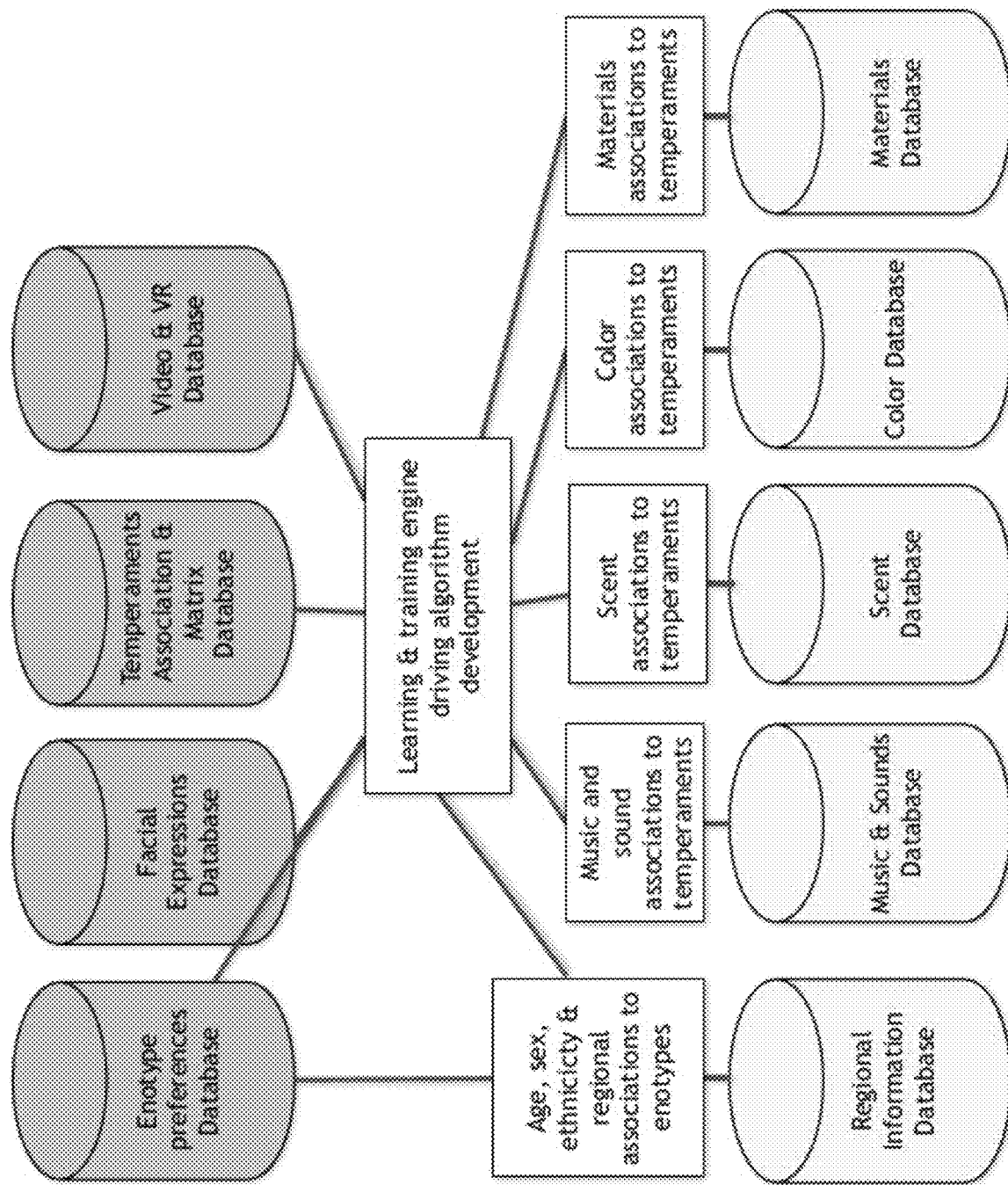
FIG. 21 illustrates a representative block diagram of a learning and training engine.

The function for text2emotivesignature 1803 is illustrated on FIG. 19, which enables natural linguistic feature extraction. It includes inputting the raw text of the text associated with an image into a function or algorithm that tags parts of speech, for example to tag which words are adjectives and/or adverbs. The adjectives and adverbs can be fed into a root vernacular projection function, and the results output as the canonical adjectives that make up the emotive signature for that image. In one embodiment, as depicted in FIG. 20, an input of a particular image can be provided and an output response of a multinomial neural network can be provided. In the depicted embodiment, the top 5 emotional responses with respect to their probabilities can be provided. In this particular embodiment, the image in FIG. 20 output:

[u'happiness', u'surprise', u'trust', u'anticipation']
['0.21896035307338782', '0.12843804501338685', '0.1204019469293522', '0.10129322651986755', '0.100905622362682']

Referring back to FIG. 18, the two equations can be solved for a given image and associated text:

$$x_i = C_i \cup T_i$$

$$y_i = \{t_l\}_{l \in CanonAdj(doc_i)}$$

$C_i$ is the PTC, signature set coming off the image and $T_i$ is the temperament distribution signature associated with $C_i$. CanonAdj.$(doc_i)$ will return the emotive signature for a particular document. The results from processing the image and associated text can be used to train a machine learning or artificial intelligence algorithm. For example, an image generative emotive grammar multinomial model.

FIGS. 16-20 are generally directed to one embodiment of an aspect that involves processing image data having associated text. The processing can include processing the "eigen-colors" of a color table to produce a probability distribution over these eigen-colors by surface area of the image, e.g., if more the image is consumed by a particular eigen-color, its % distribution will be higher. Given this eigen-color distribution and an inversion of an AI multinomial distribution, the distribution of color maps back to emotive grammar and geometric artifacts of groups of similar grammar. Inversion here means P(A|B) ("probability of A given B") can lead back to P(B|A) ("probability of B given A"). The mathematically learned structure needed to invert this falls out of machine learning.

Anchoring decisions to eigen colors to outcomes creates a dataset-based relationship to a desired effect. In particular, that for a variety of problems how these canonical entities induce a degree of favorable outcomes to lesser so—thus anchoring, in a problem specific manner, a relationship of color or emotive grammar, and emotive grammar to possible images.

Building up a dataset of all appropriately applicable outcomes and their solution structure with regards to emotive grammar and eigen colors can produce a useful dataset for various applications.

The system and method collects opinions on emotive grammar and its mapping to color. This allows a flexible, probabilistic structure to be learned, e.g., the value is in quantifying the nuances of "agreement", "bifurcation" and "disagreement" on those associations. An application programming interface is queried with a color distribution and output a distribution over emotive grammar, or queried with an image to determine likely outcomes. The system and can flexibly accommodate a wide range of input conditions and respond with appropriate output regarding the relationship between color and emotive grammar.

One embodiment of the system and method discussed above, includes receiving a desired emotive response, for example in the form of a plurality of emotive words, and moving through the steps to map those emotive words to assemble appropriate eigen-colors, or temperaments.

This is the query to the AI service that will return an array of appropriately mapped color. A common mathematical notation for such a multidimensional (vector) query is x. The artificial intelligence can learn the mathematical mapping between each eigen-color ordered as an array or vector denoted by y. Thus, the retrieval operation learned through the proposed mixture of experts neural network (potentially a deep neural network, i.e., "deep learning") is the mathematical function (encoded as software powering the application programming interface) is p(y|x) or element-wise (over each color p(y|x)=[p(y1|x),......, p(yn|x)].

Although some embodiments can utilize a single emotive word to provide an Eigen-color distribution or temperament distribution, other embodiments utilize multiple emotive words to provide a desired emotive response. That is, the combination of words is relevant. The combination of words can be nuanced with higher order nonlinear interpretations gleaned from the language. Put simply, three words in aggregate may provide different results than those three words alone or in combination with different words. Artificial intelligence enables a more complex grammatical input and can produce more outputs that more closely align with the changing language of color and language.

In one embodiment, complex grammatical input is geometrically mapped to a learned topic and conditioned on this topic, the probability distribution across Eigen-colors could potentially be different than that of another topic. When weighed together across all learned topics, the topic most representative of the input grammar tends to contribute more.

One attribute of a "selection" of eigen-colors against an emotive grammar input is that there are design principles of esthetically accompanying colors to each other. Given the "smooth" technicolored nature of the eigen-colors in the color table of FIG. 1, it is possible that the artificial intelligence multinomial model over colors could produce high and similar values across similar colors for a given emotive grammatical input. The probabilities over each color can optimize an additional score, adjusted for coupling effects from known like patterns. For example, the top K colors based on their score can be chosen to reflect the colors associated with the brand of interest's desired emotive color palette.

The selection process can be replaced by building models that relate emotive grammar and eigen-color relationship to outcomes. Interaction effects across colors versus returning colors independent of any relation with each other modeled as the multinomial.

The ultimate product goal of a deeply learned AI based emotive color manifold that leads to colors being programmatically selected and optimized corresponding to desired emotions (or vice versa) across all industries and product sectors. It can include nuanced and non-linear interactions, a complex grammar of emotive input, and can be wrapped up as a software product as an API (application programming interface) that can be applied to any separate system.

One embodiment includes an intelligence system capable of mimicking how humans form subconscious profiles and opinions when confronted with exposure to color, beginning with a system to retrieve the "canonical color" (or eigen-color) associated with a given emotion (a finite grammar), i.e., Map={Emotions}X{Color}. The cardinality of the emotion and color space is fixed and finite.

The intelligence-based system can accept a grammar (potentially complex-higher ordered and nuanced) of desired emotions wanting induced from a returned array (singular or group) of "eigen-colors" (the set of canonical colors in the color map). This can provide a query language not currently modeled from such color map look-up table or periodic table of emotive colors that approximates how we innately form cognitive primal emotional profiles and opinions of objects with color.

The intelligence can be built to replicate the signal of how most humans react and describe colors. The AI model can be expanded to accommodate more complex scenarios where the predictive performance of such AI monotonically improves with time.

A corpus of images and associated text can be utilized as training data. Data can be collected regarding how individuals assign relationships between emotions and a given eigen-color. This can establish how a wide range of people view these mappings as likely they are not mutually exclusive and any machine learning based model can learn those duplicative nuances that lead to scoring an input/output combination.

A variety of different artificially intelligent networks can be utilized. Deep multinomial learning can be conducted with sufficient training data. The problem can be represented as a multinomial (probabilities over all eigen-colors given input emotive grammar)-this mathematical mapping which allows one to score the likely response of color given an emotive input grammar is the output. In one embodiment a mixture of experts multinomial neural network capable of accommodating deep non-linear structure (mathematical manifold) can be utilized. That is, as input language expands beyond a singlet (single emotive word) to a more complex description, the intelligent network can capture these nuances over an eigen color or top K eigen-colors scored by the model. One caveat of learning a generative representation of input: grammar->color is that it can be inverted to obtain color->grammar relationships.

Figure 23:
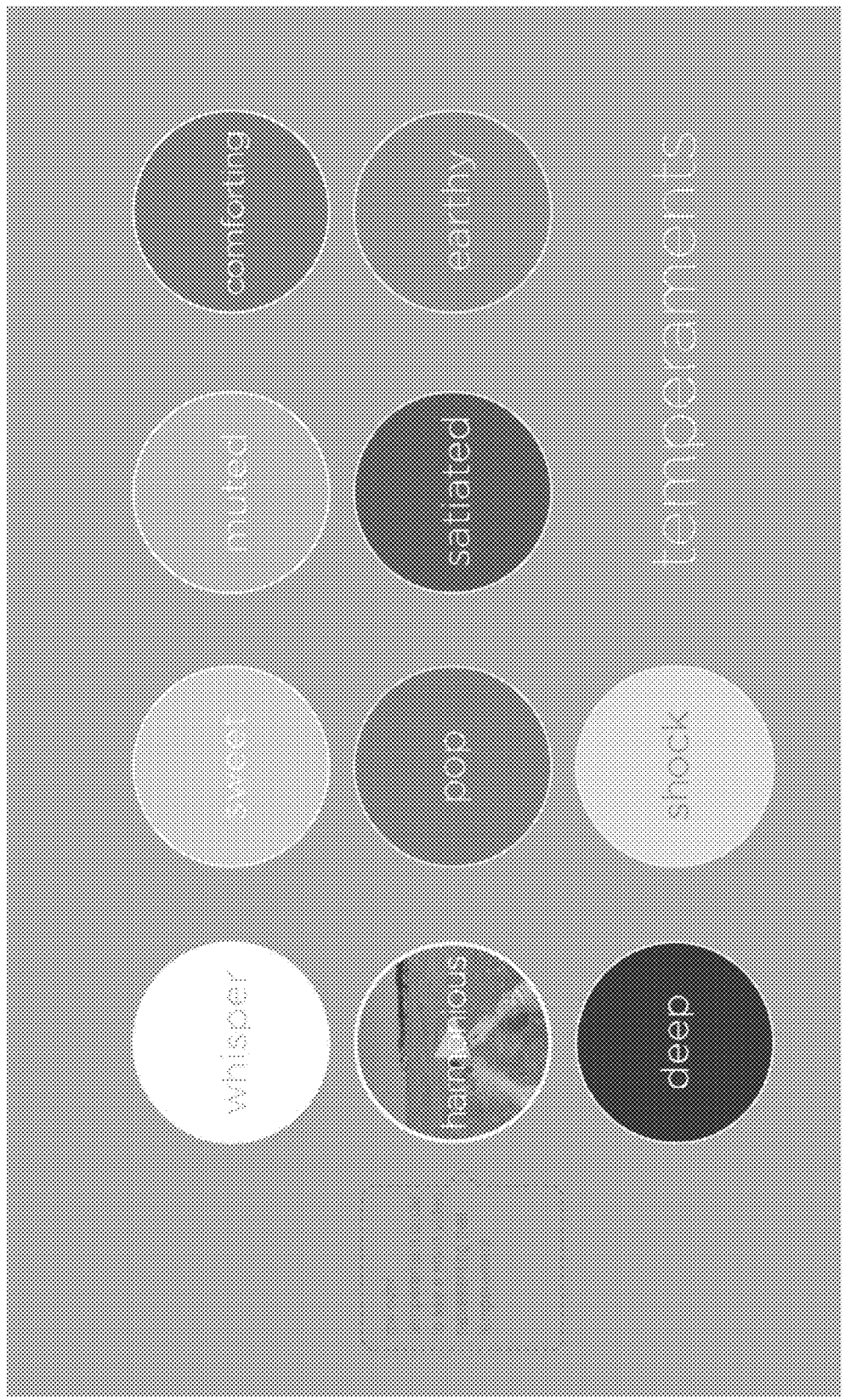
FIG. 23 illustrates an example interface for providing a sensorial temperament experience.
Figure 24:
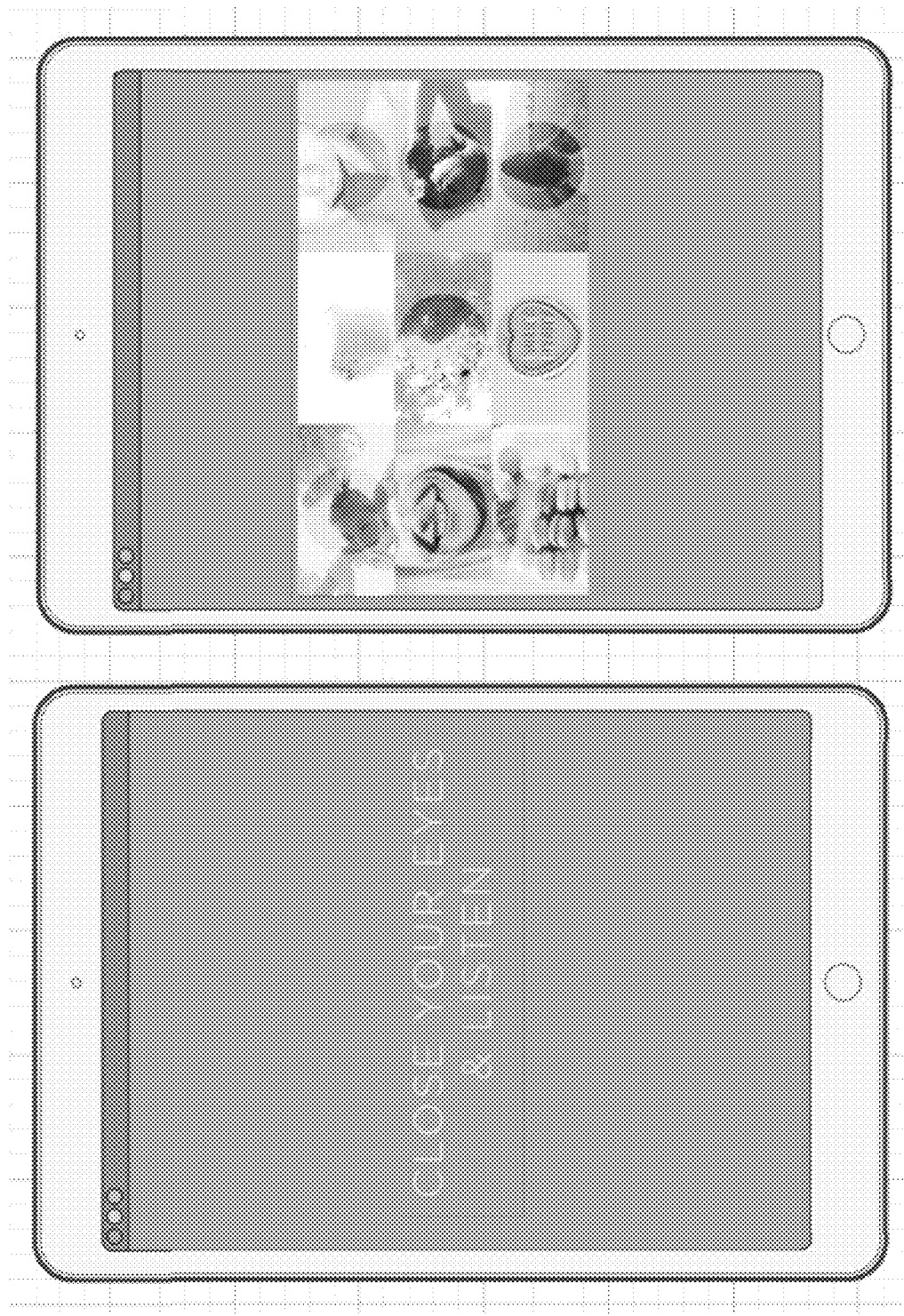
FIGS. 24A and 24B illustrate an example interface for providing a descriptive/sensorial temperament experience.
Figure 25:
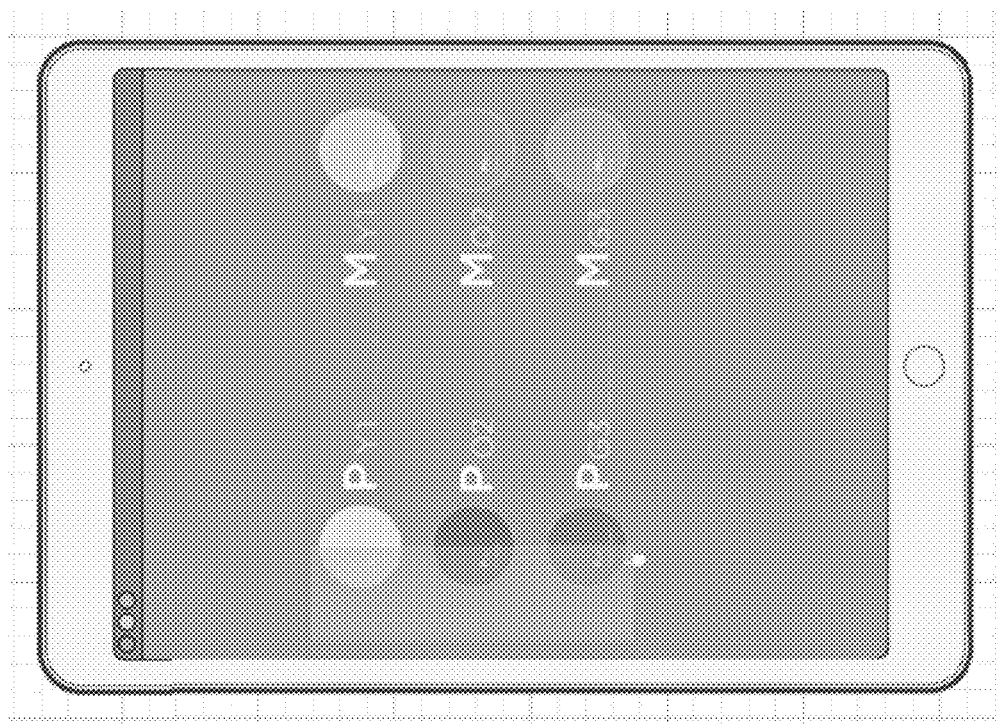
FIG. 25 illustrates an example interface for providing a descriptive/sensorial temperament experience.
Figure 26B:
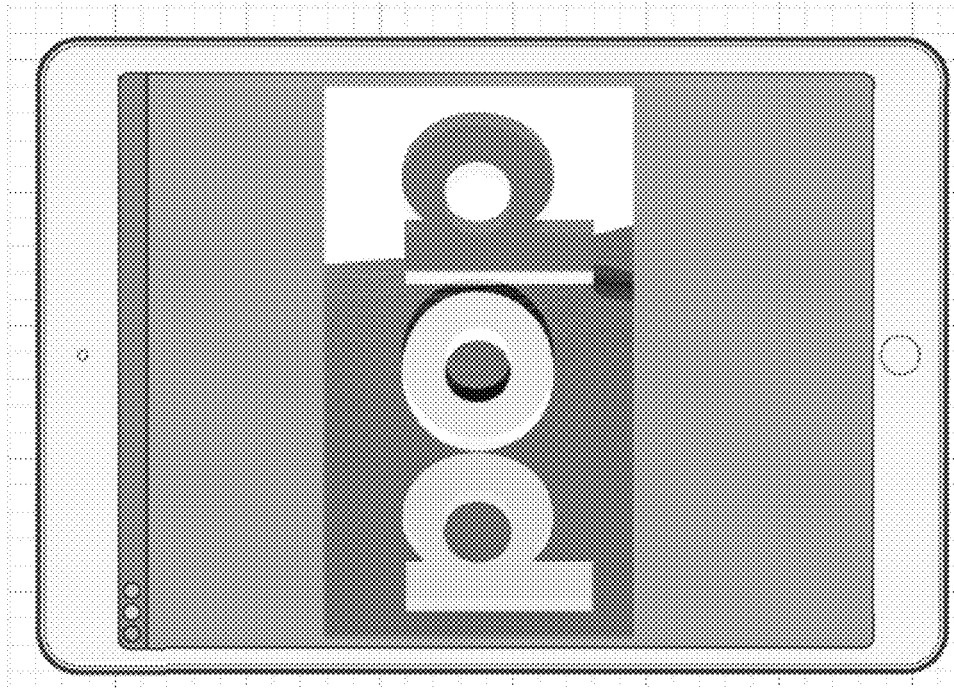
FIGS. 26A and 26B illustrate an example interface for providing a descriptive/sensorial temperament experience.
Figure 26A:
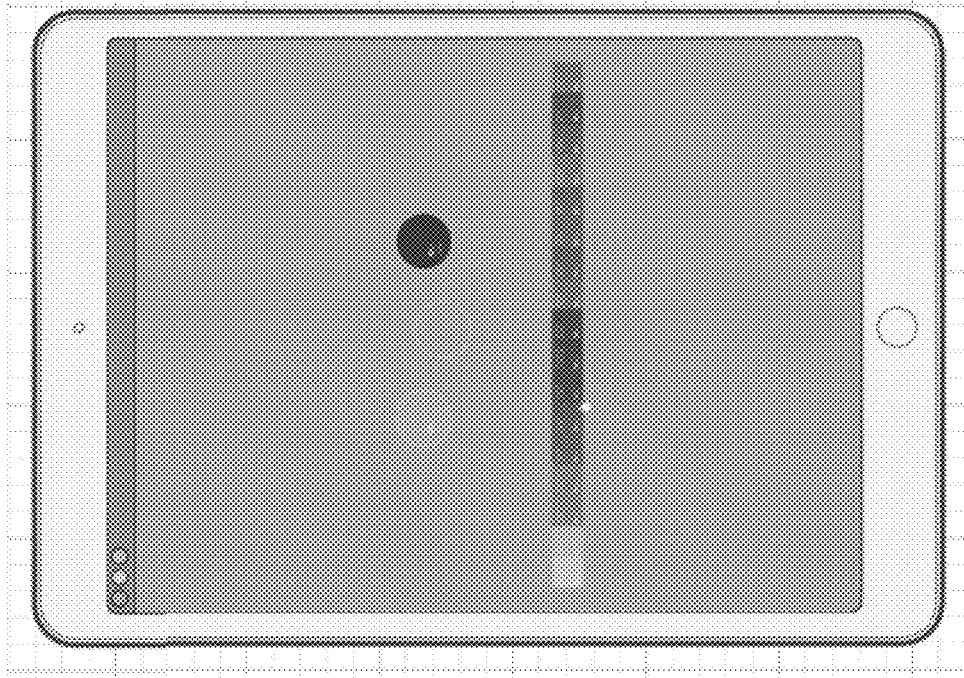
Figure 27:
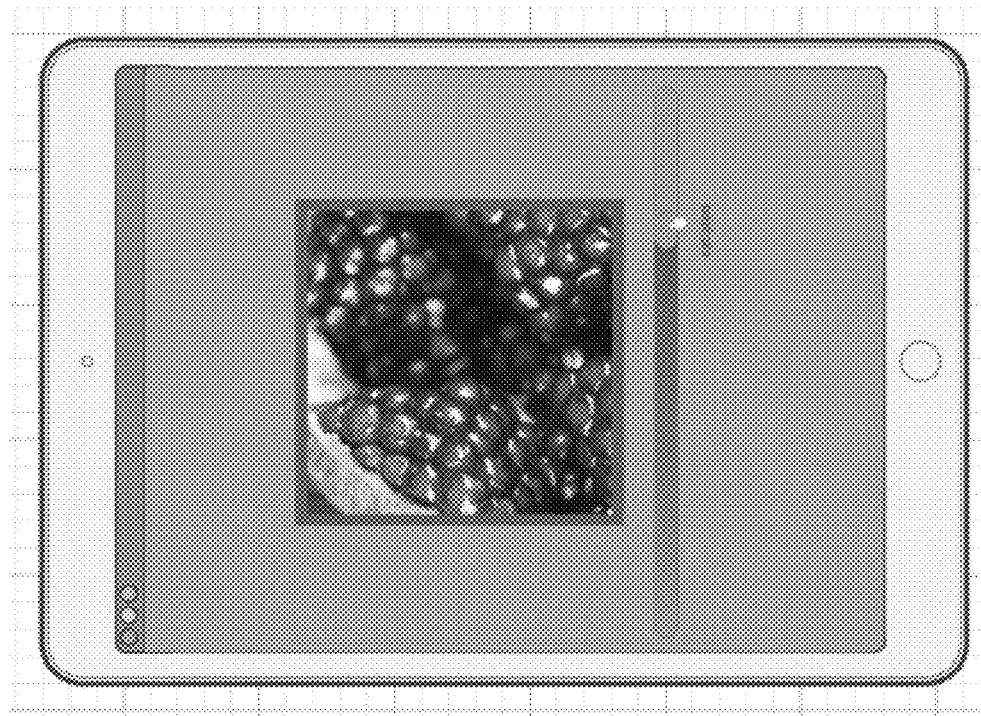
FIG. 27 illustrates an example interface for providing a descriptive/sensorial temperament experience.
Figure 28:
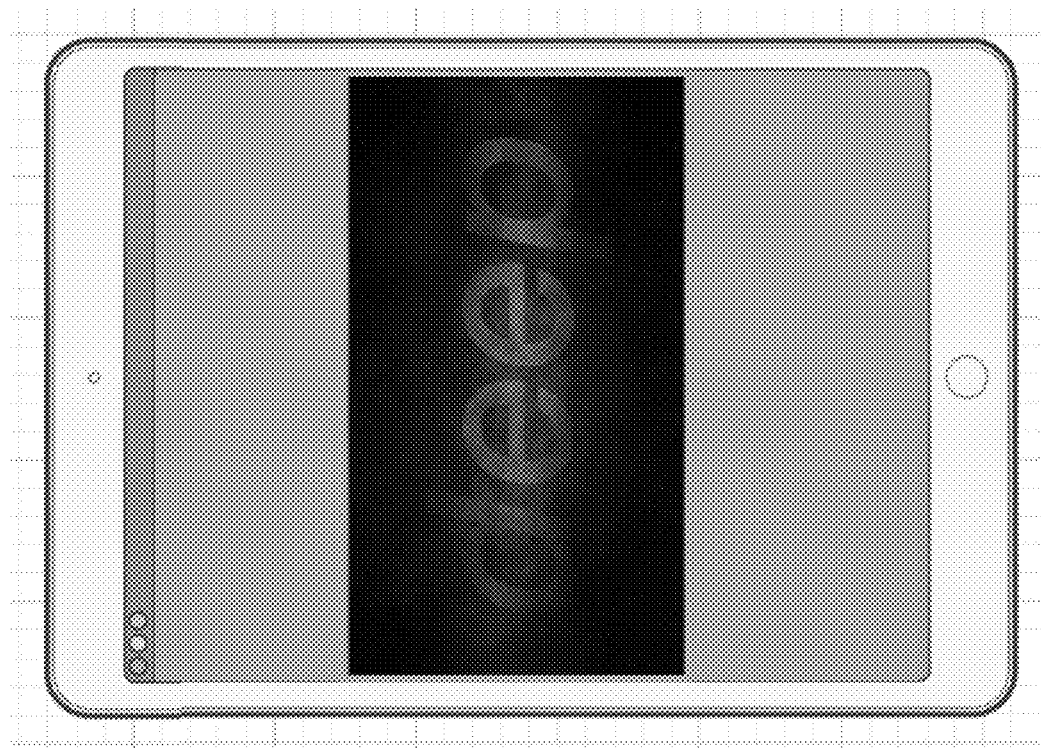
FIG. 28 illustrates an example interface for providing a descriptive/sensorial temperament experience.
Figure 29:
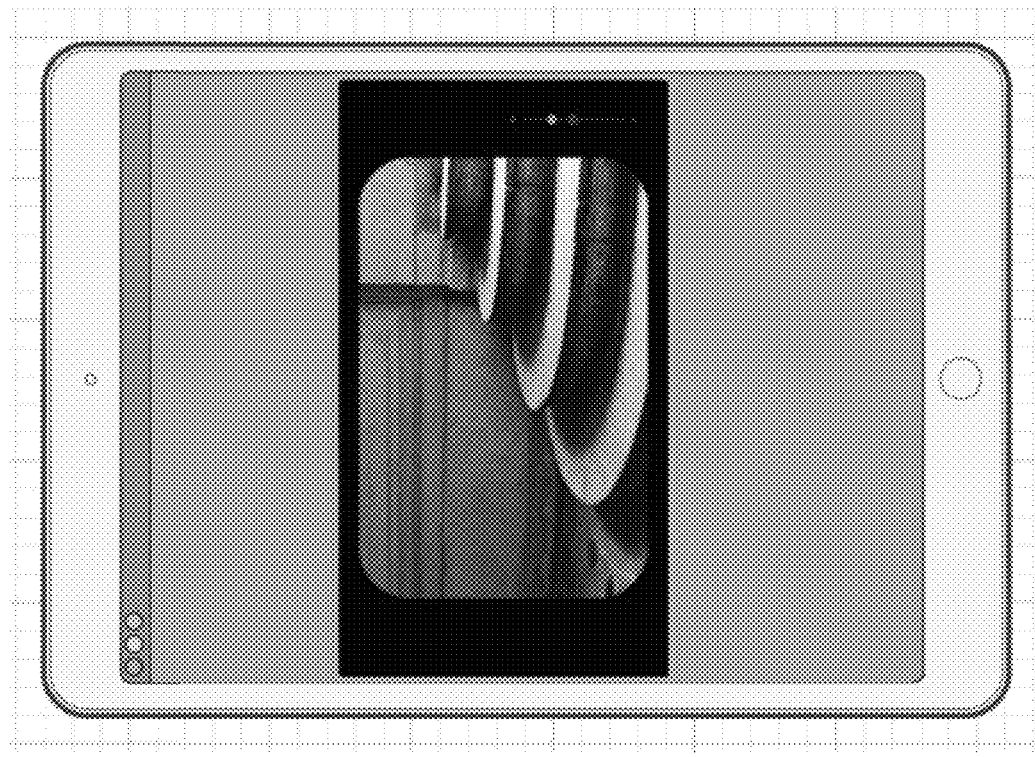
FIG. 29 illustrates an example interface for providing a descriptive/sensorial environment experience.
Figure 30A:
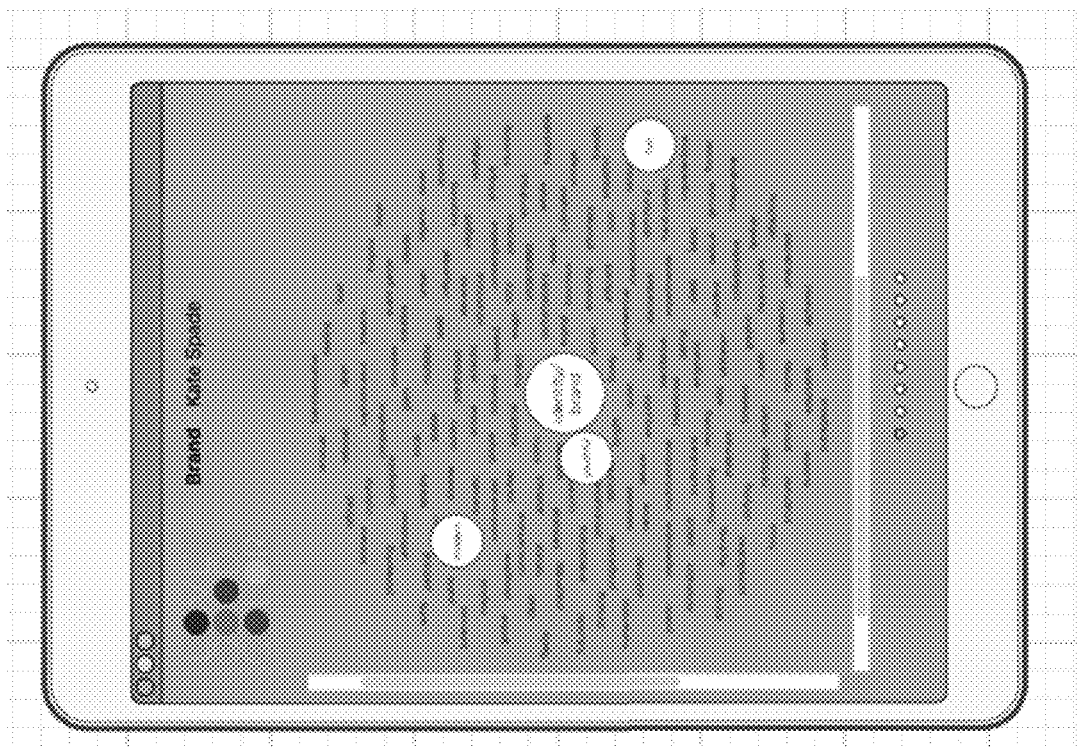
FIGS. 30A and 30B illustrates a representative view of an example interface for a color selection tool
Figure 30B:
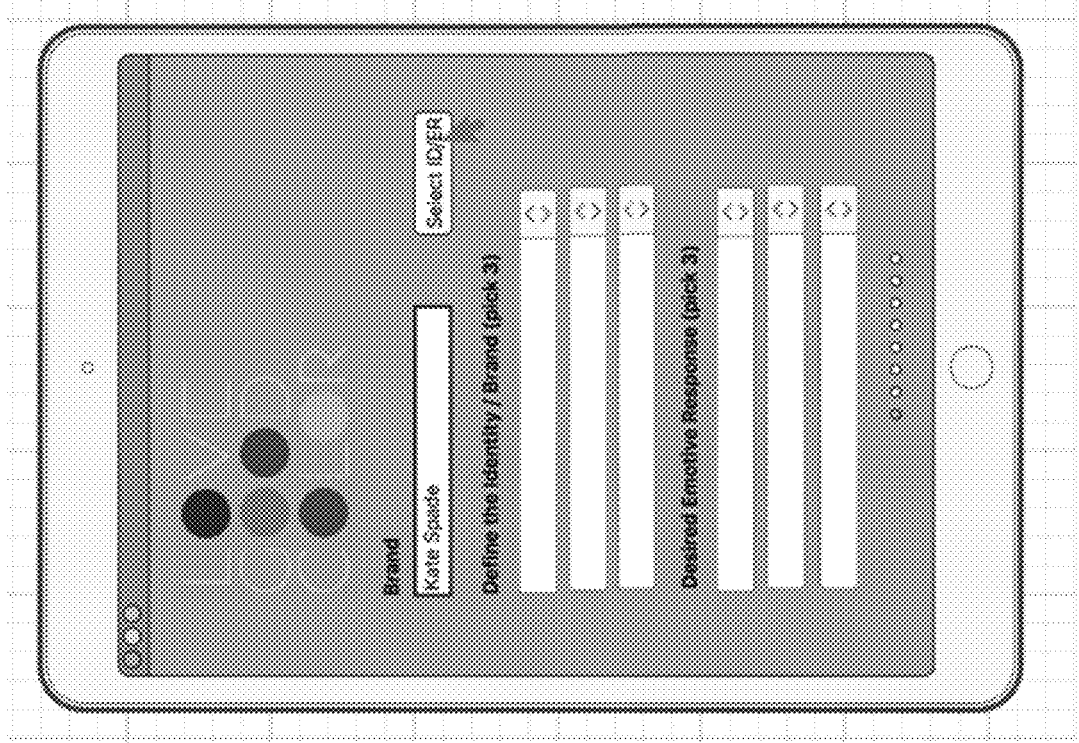
Figure 31B:
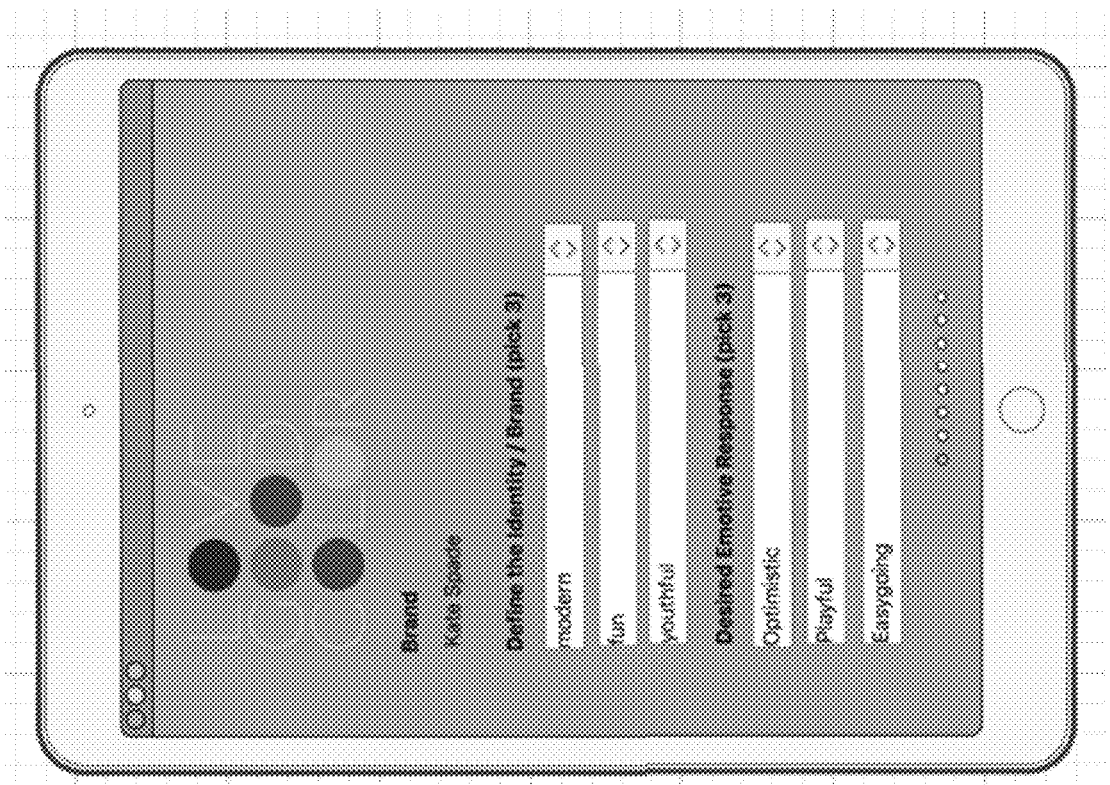
FIGS. 31A and 31B illustrates a representative view of an example interface for a color selection tool
Figure 31A:
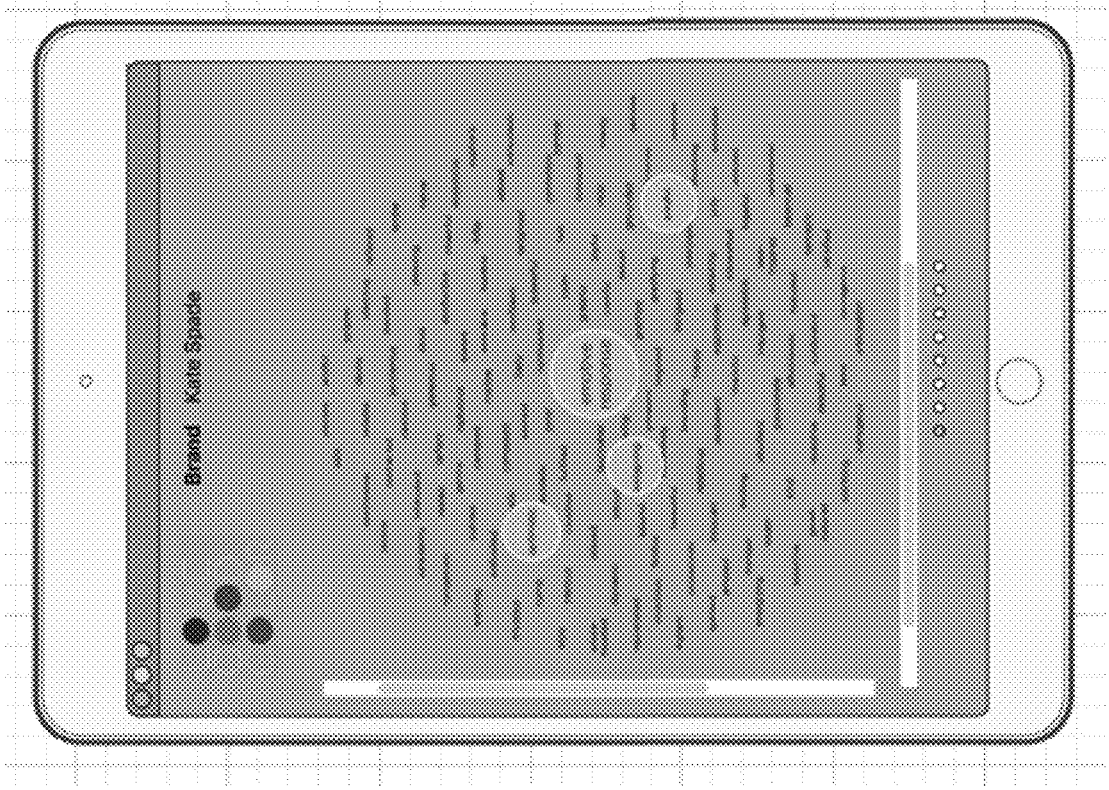
Figure 32B:
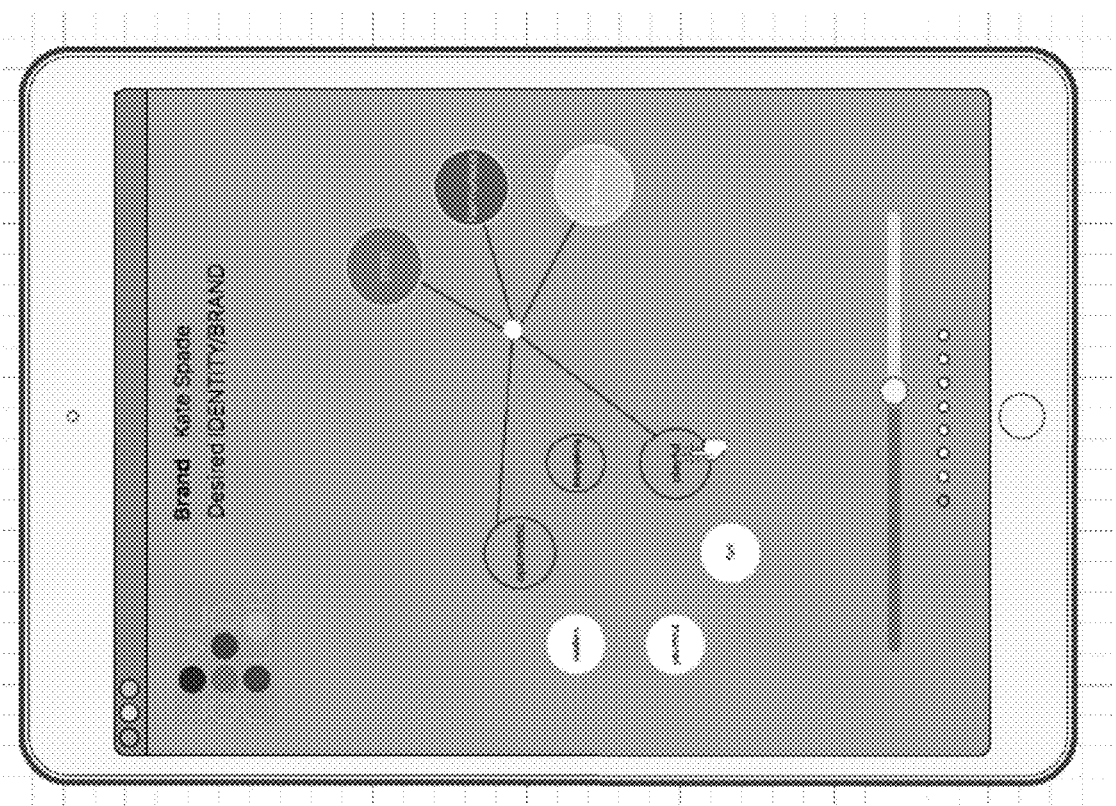
FIGS. 32A and 32B illustrates a representative view of an example interface for a color selection tool
Figure 32A:
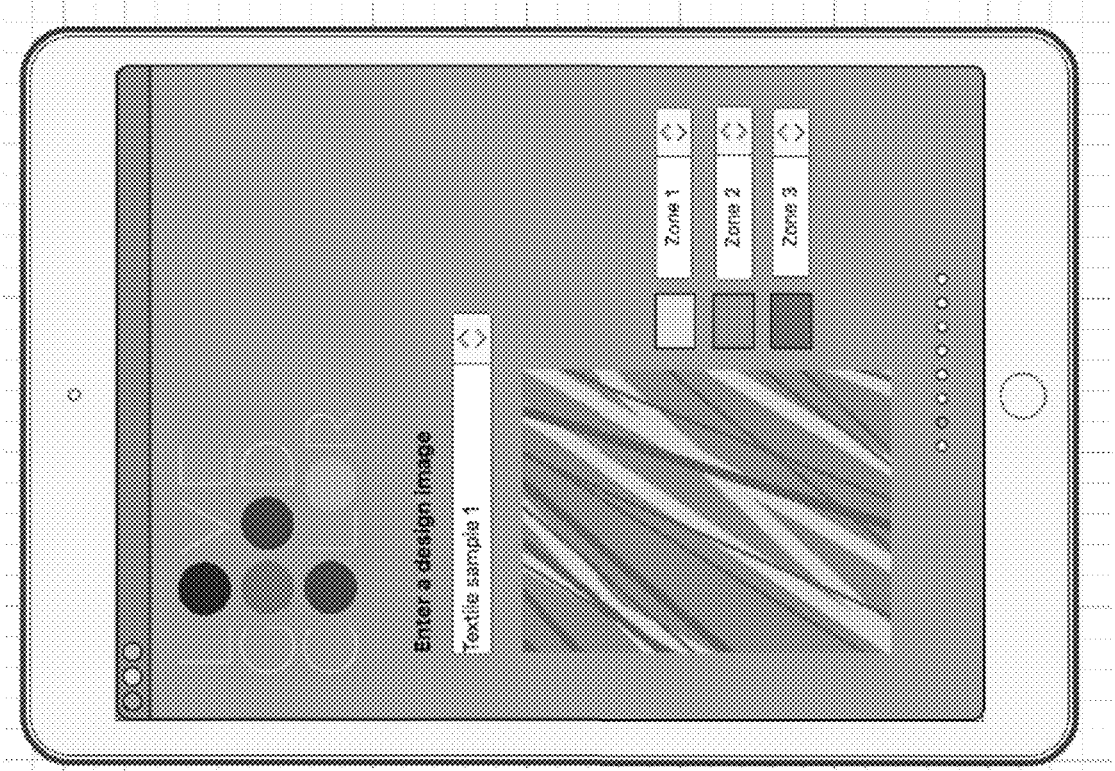
Figure 33B:
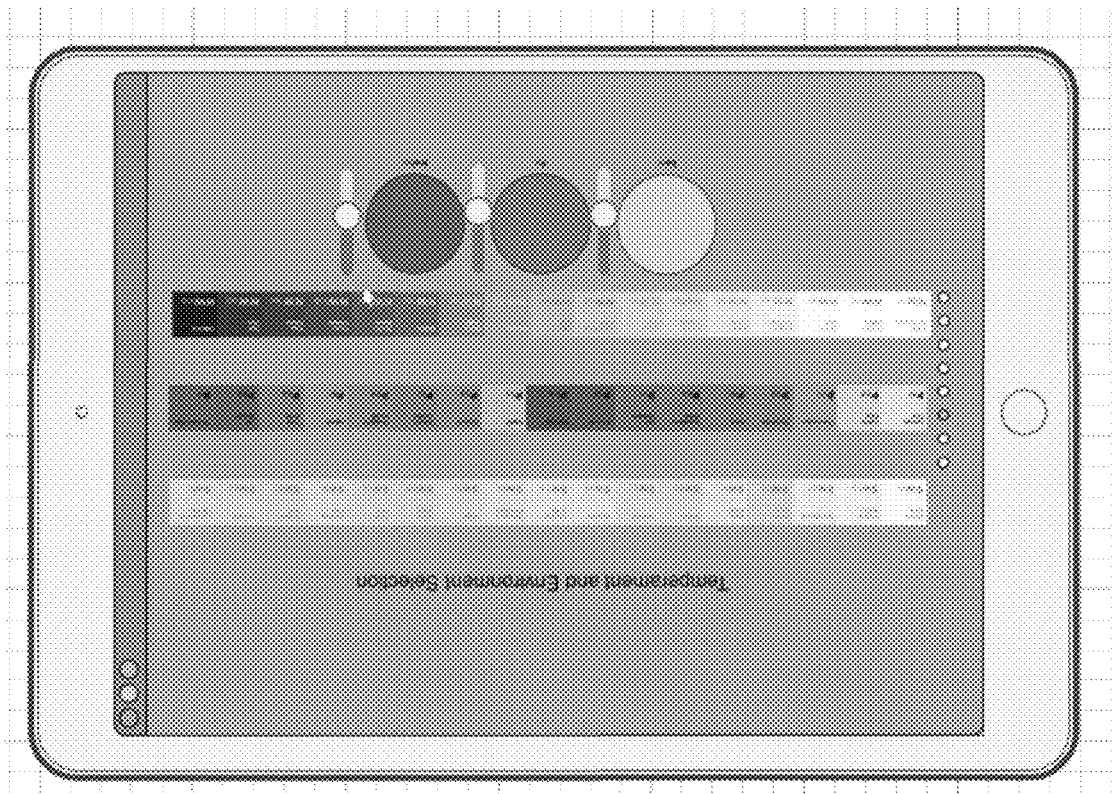
FIGS. 33A and 33B illustrates a representative view of an example interface for a color selection tool
Figure 33A:
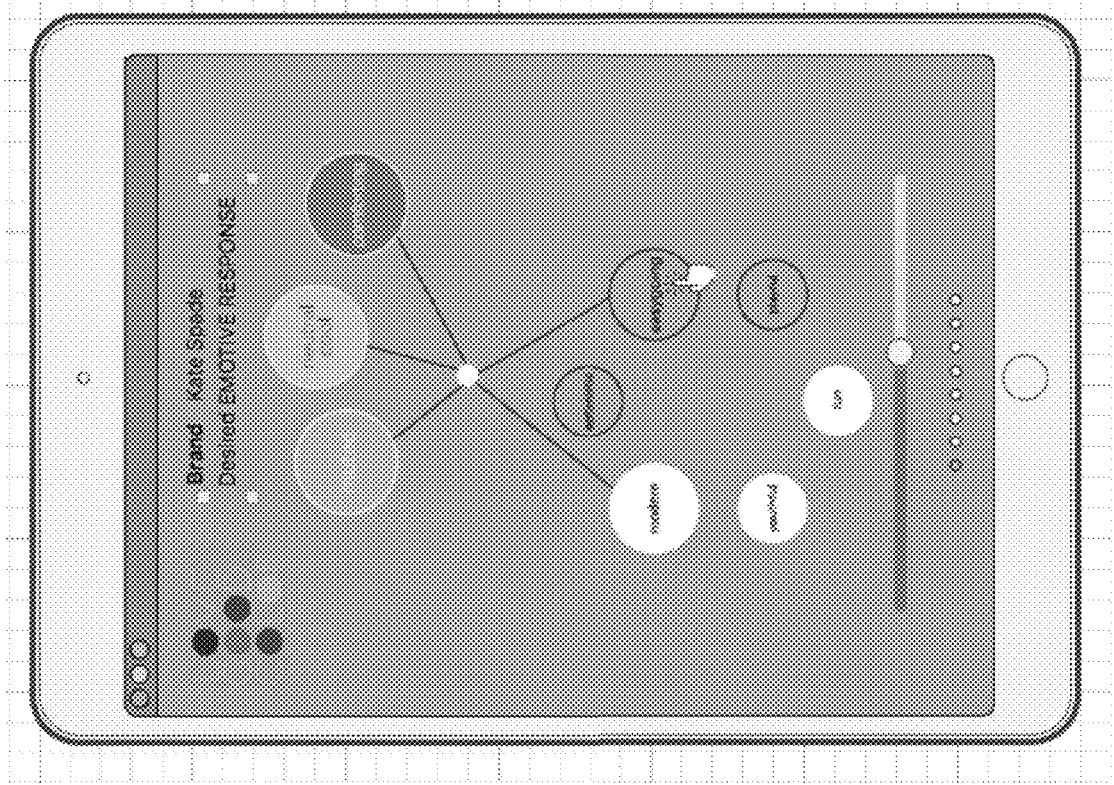
Figure 34B:
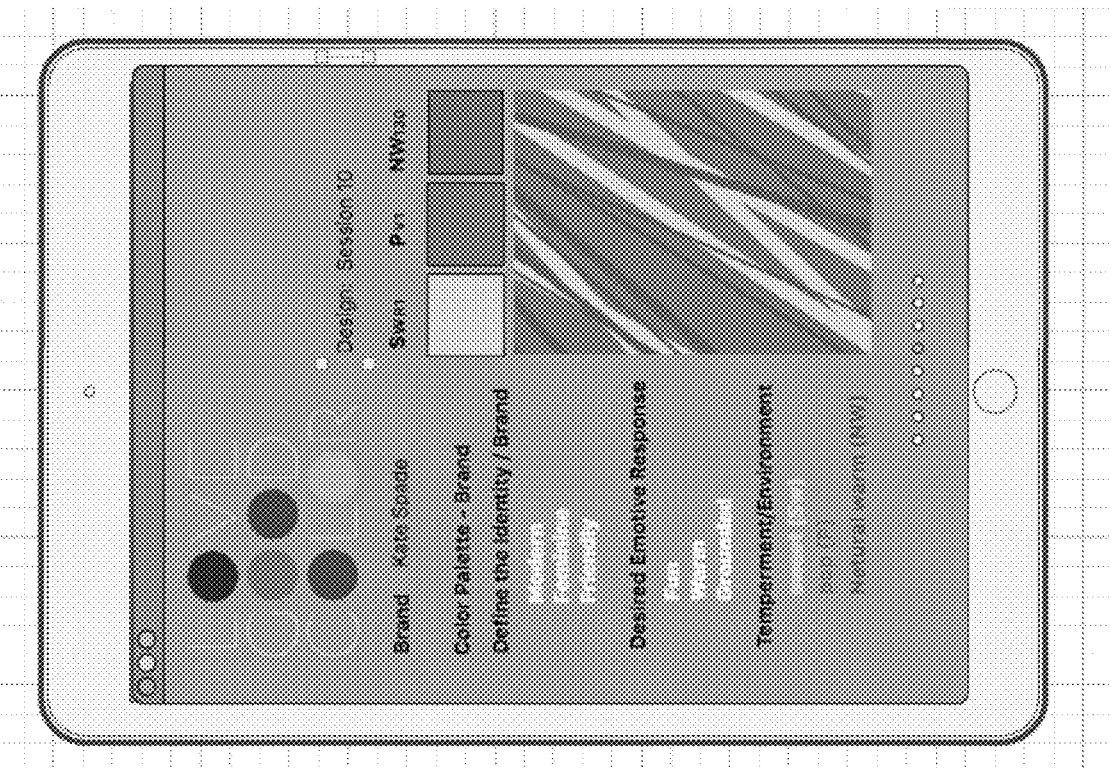
FIGS. 34A and 34B illustrates a representative view of an example interface for a color selection tool
Figure 34A:
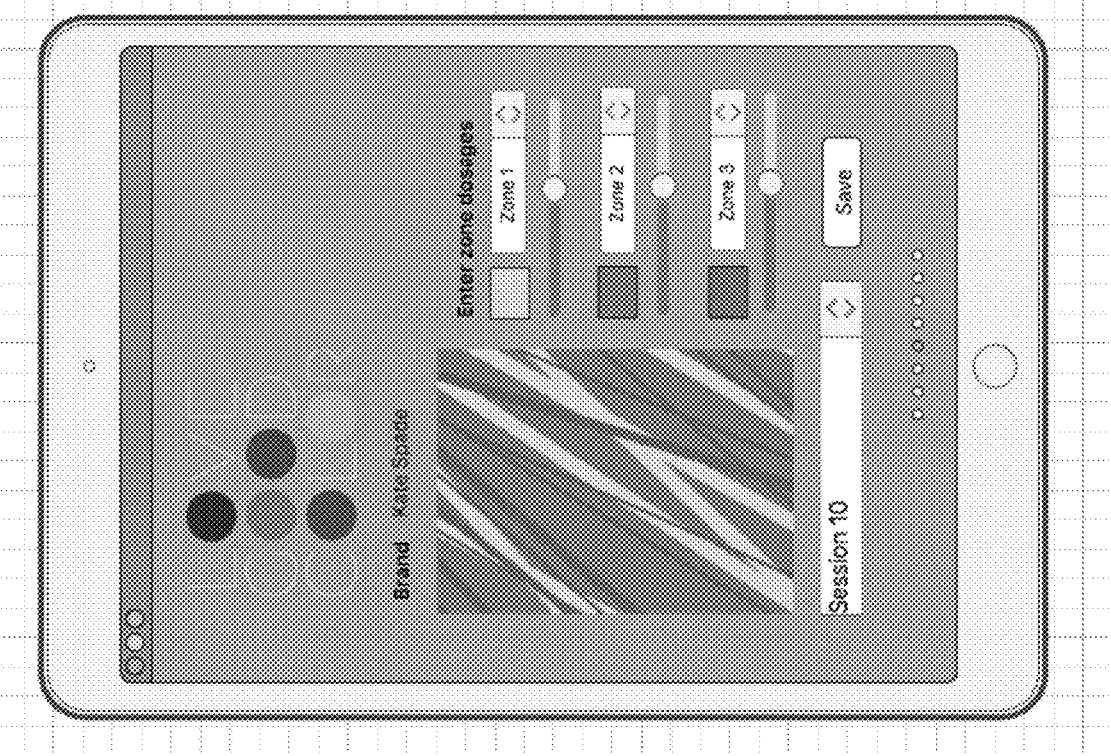

FIG. 23 shows the ten color temperaments of one embodiment. The words are carefully mined and additional temperaments can be added. All are multi-sensorial experiences and share specific color qualities based more on intensity, value and chroma than hue. The temperament/environment defining characteristics are measurable and can be used as a foundation for a tool to scan and determine temperaments with multiple materials.

Systems and methods for color analysis, purposeful selection/outcome and communication that supports the selection, combination, evolution, and real time change of colors to respond to changes in inputs into situations and environments—all to achieve specific impact on people and their needs.

Figure 22:
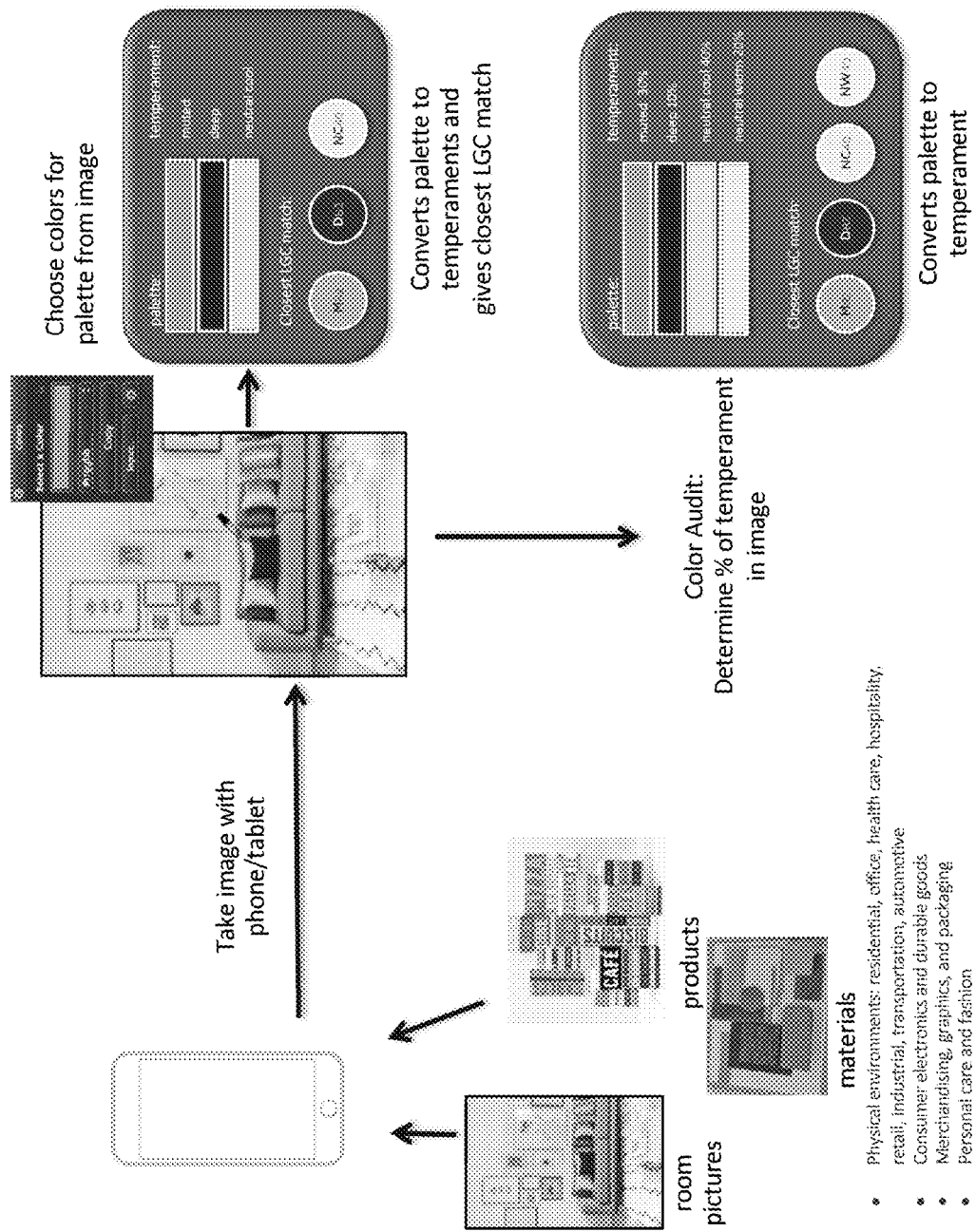
FIG. 22 illustrates a representative flow diagram of one embodiment of a color audit process.

FIG. 22 illustrates one embodiment of an audit process according to one aspect of the present invention. A device, such as smart phone, can obtain an image of the audit target. For example, an image of a picture of a room, a particular product, or a type of material can be taken and provided to the system. Alternatively, an image could be received as opposed to taken at the time of audit.

In one embodiment, the system, with a computer processor, processes the image to break it into its constituent parts, for example pixels. In one embodiment, the image is broken down into a plurality of pixel color values each having an RGB value. In an alternative embodiment, the image could be processed to pixel color values using a different color system, such as L*A*B*. The system can process these pixel values to determine the colors in the main palette of colors from the image. That is, the image can be processed to determine a finite number of colors that are most well represented by the image. To be clear, the image may include a large variation of pixel color values and through clustering and processing, for example, using a nearest neighbor clustering algorithm, the image can be processed to determine the two, three, four, or some other number of colors that best represent the image. The colors representing the image (i.e. the palette from the image) will not necessarily (but often will) match the color values of the pixels most represented in the image using the k-nearest neighbor approach.

In an alternative embodiment, certain color or colors of the image can be selected for the palette by the user for auditing. For example, the selection can be performed by the user with an eyedropper or other tool that allows the user to select a particular pixel or group of pixels and the associated color value.

Once the colors for the palette from the image are selected (for example, by the automated process described above or the user-assisted process described above), the palette can be converted to temperaments and provide the closest temperament matches. In addition, the closest matching discrete color(s) that led to selection of the provided temperament(s) can also be provided to the user. That is, for example, each palette color value can be compared to each color value of the various colors that make up the different temperaments and the closest matches can be identified as the matching temperament to which the closest color belongs. The similarity can be measured with a variety of different distance metrics, such as the distance metrics described above in connection with the image2emotive grammar API. Optionally, the color audit process may determine the percentage of temperament in an image and provide that value to the user. For example, in FIG. 22, the muted temperament is about 30% of the image, the deep temperament is about 10%, the neutral cool environment is about 40%, and the neutral warm is about 20%. These percentages can be calculated based on the amount of pixels that map to colors in that respective temperament. When the audit is complete, the temperaments, and optionally percentages, can be provided to the user, which provides a color audit of an image—that is the user can see how the main palette of colors used in the image maps to the temperaments. In one embodiment, representative physiological responses associated with the temperaments can be provided to the user based on the correlations between the temperaments and the physiological responses.

Figure 35:
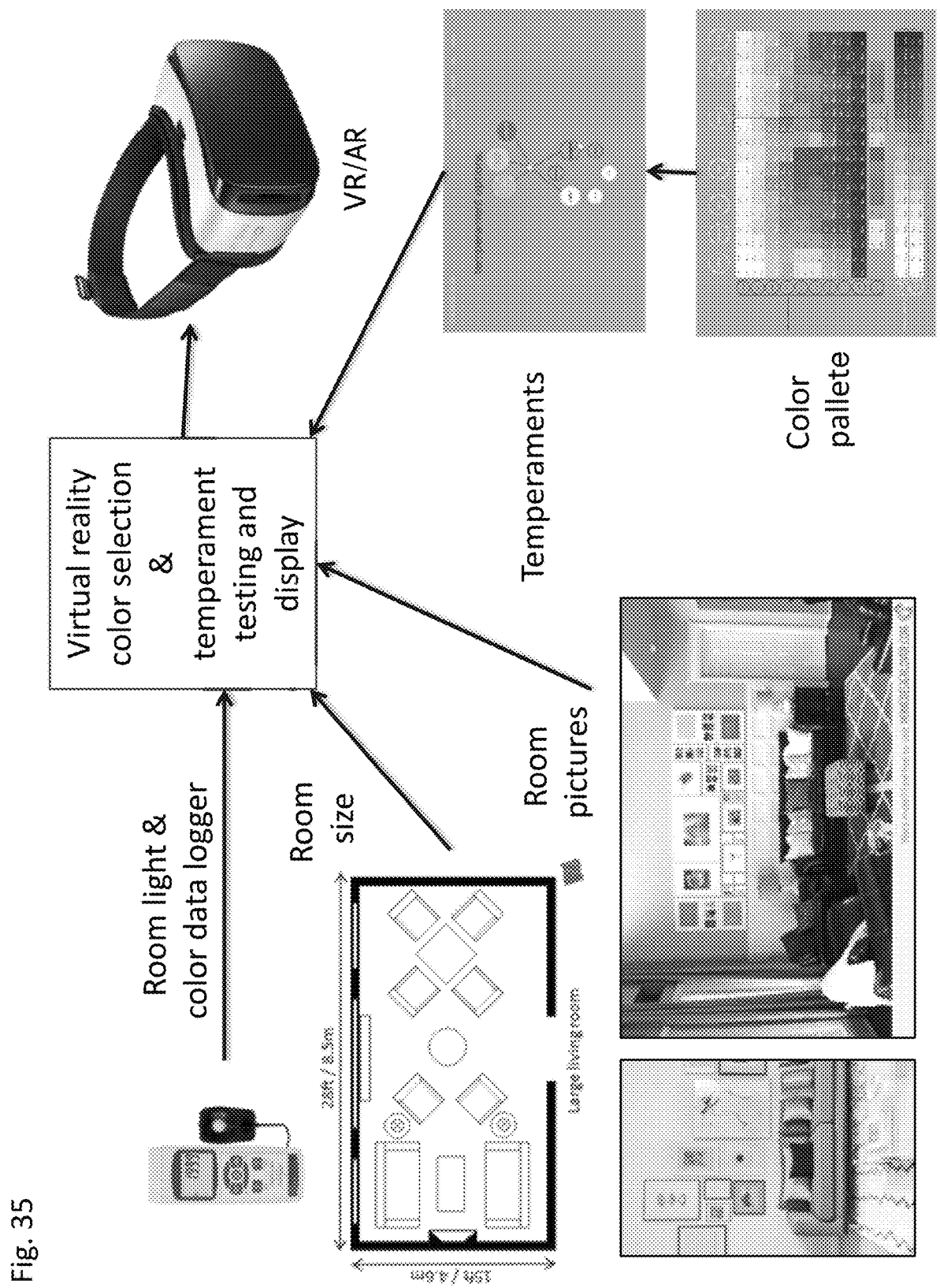
FIG. 35 illustrates a representative view of an example virtual reality (VR) and augmented reality (AR) color selection, testing, and display system.

FIG. 35 shows a virtual reality (VR) and augmented reality (AR) system for systematically displaying, testing, combining, and selecting colors and their combinations (dosages) in potential environments and situations.

FIG. 35 A virtual and augmented reality system that uses your proximity and knowledge of natural lighting in your area along with interior design details to select and predict color impact FIG. 36 A dynamic point of sale VR and/or AR system that adjusts to specific individual and group identity, needs, and preferences (including enotypes) and situations for an enhanced experience A digital platform that connects learning, design, and specification tools to manufacturers and providers of components to let users easily sort, sample, and order products and peripherals that fulfill the color objectives of their situation or environment.

Figure 38:
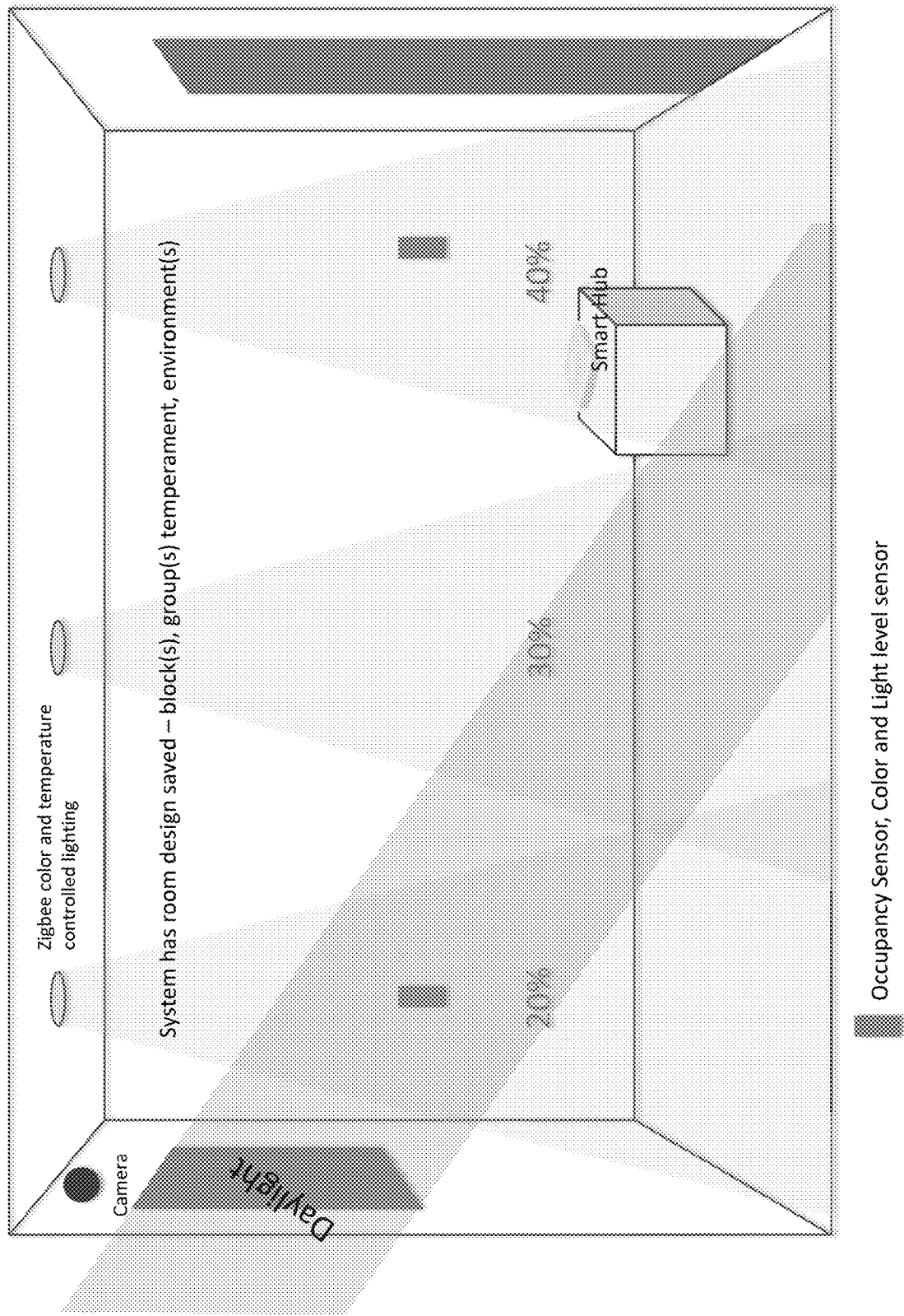
FIG. 38 illustrates a representative view of an example lighting control system.
Figure 39:
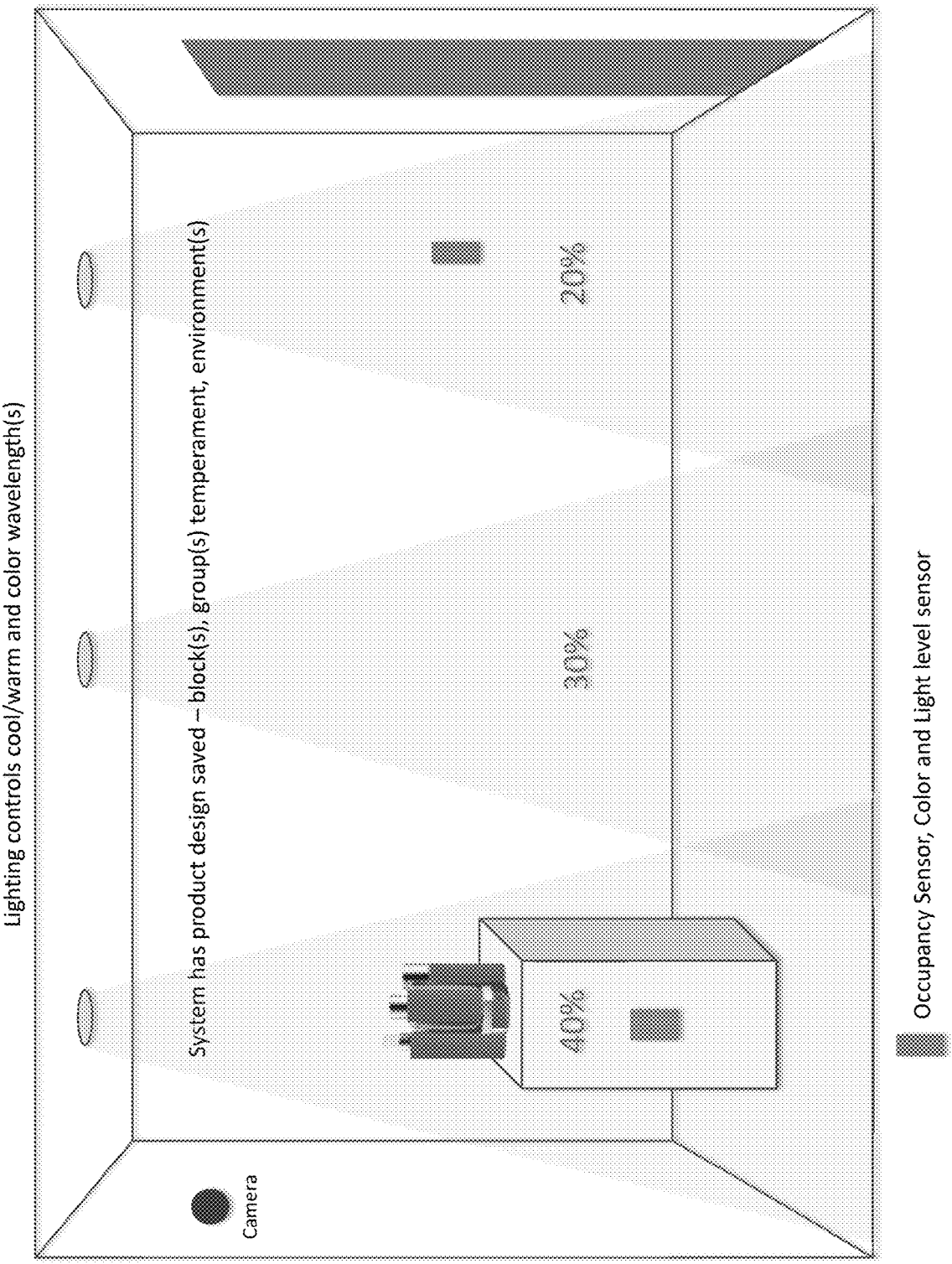
FIG. 39 illustrates a representative view of another example lighting control system.

FIG. 38-39 A system that tracks the initial color impact and adjusts color and environment to collect response data based on stimuli FIG. 38-39 The system of number 2 with a control system that also collects lighting and room color data and can shift colors and lighting levels. The system may also introduce other environmental conditions like sounds and scents.

Figure 41C:
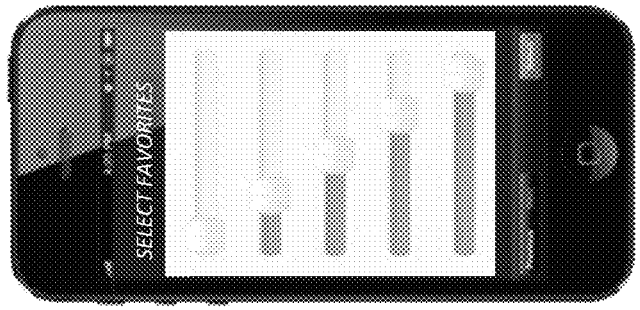
FIGS. 41A, 41B and 41C illustrate screenshots of an example color application.
Figure 41B:
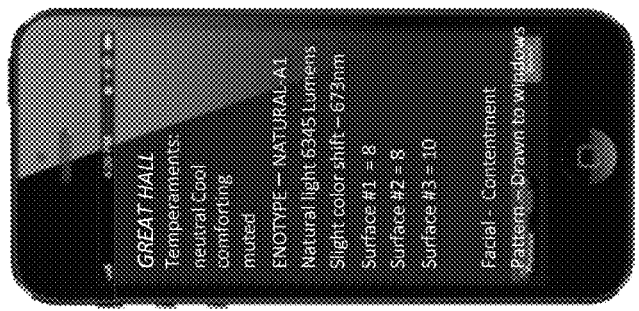
Figure 41A:

FIG. 41A-41C A method to generate environmental shifts like nature using these shifts to track impact stimuli and promote research FIG. 41A-41C Our environment in nature continuously introduces new stimuli that can draw focus or facilitate focus. Understand these is important but as in number 2 having a method to introduce multiple conditions while statistically identifying the outcomes over time.

Figure 37:
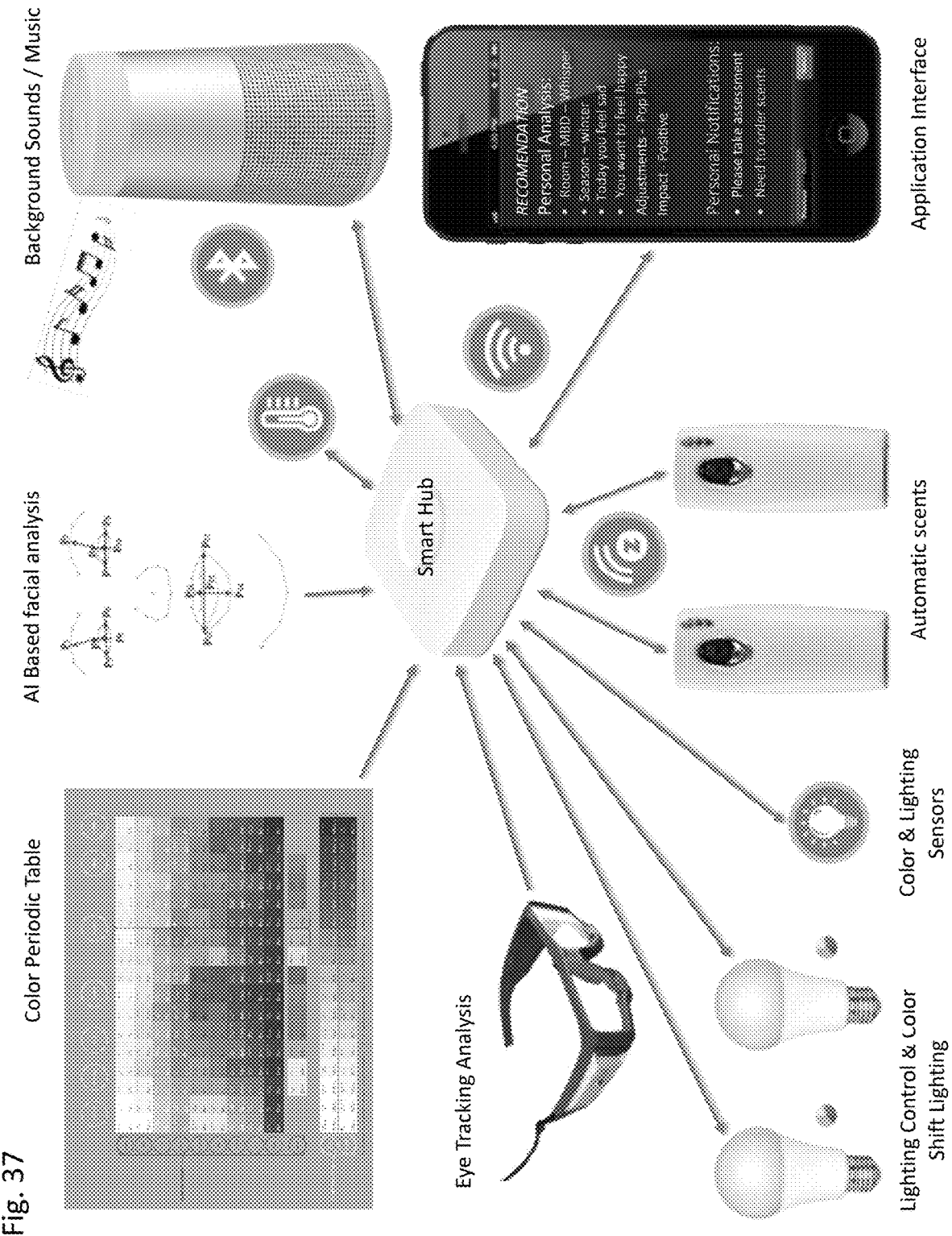
FIG. 37 illustrates a representative view of an example smart hub and associated system.

FIG. 41A-41C A network controlled system for optimizing shifting color based on enotype, temperaments, seasons and environmental controls FIG. 37 illustrates one embodiment of an enotype tracking and control system utilizing light and color sensors as well as color shifting lighting and controls. The system is also equipped with AI enhanced eye tracking and facial recognition software. The control system also has additional functionality of adding scents and sounds into the environment. The system has a room identifier to know the base wall colors, floor colors, natural lighting and materials selection as well as other furniture and decorative attribute details. The hub is a Wi-Fi capable with cellular connectivity as needed. The hub also has z-wave and ZigBee capability for automation controls and interface making installation and communications easy. This system is also application enables for survey tracking and push notification and survey question texting to track feedback to further track the experience.

FIG. 38 shows an example of the enotype monitoring and control system. It monitors lighting color and intensity and contributes dynamically to the room with both colors and lighting as required for the specific enotype. The smart hub gathers data while monitoring sensors and tracks the user for favorable and unfavorable impressions of the environment. This system is utilized to control the environment, track behaviors, track movement and track facial expressions to help characterize the impact of color on behavior.

FIG. 39 shows the same type of room or environment as seen in FIG. 2 but it is designed for product. The system dynamically tests for the best colors for consumer acceptance through this monitoring. The same configuration could be used actively in a retail store to test for the best sales or even dynamically adjust to specific enotypes dynamically.

Figure 40:
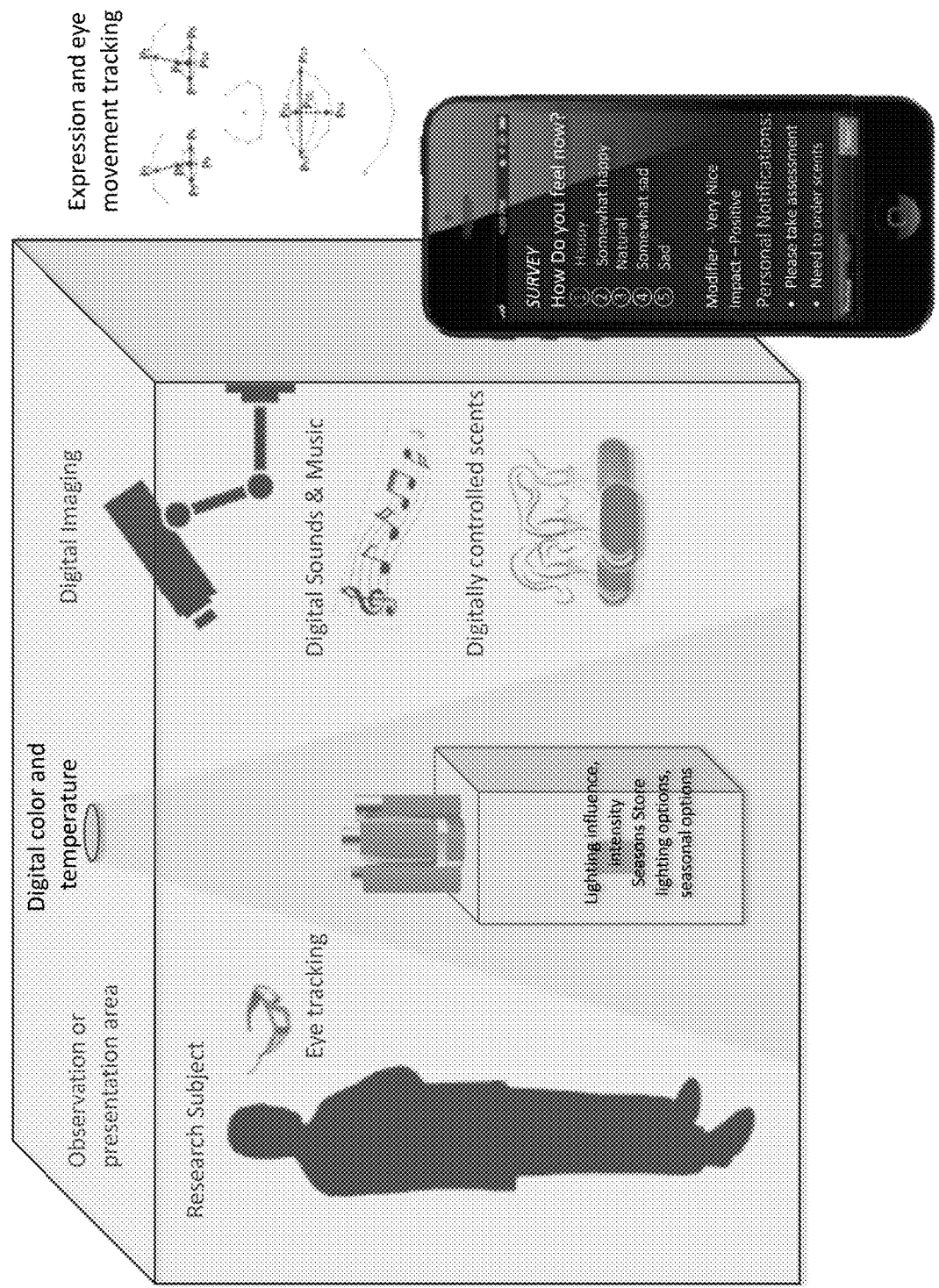
FIG. 40 illustrates a representative view of an example research tool.

FIG. 40 shows the enotype control and monitoring system as a research tool. Although this can be embedded easily into almost any environment having a lab helps to set baselines and more formally gather data and control the stimuli. The system can run a design of experiments and statistically analyze data to formulate and prioritize key drivers for key responses.

FIG. 41A-41C shows a mobile device with a control and survey application equipped to ask questions to verify responses, get control feedback and verify facial expressions. One screen shows the survey feedback requests to a given presence in a room. The second scree shot shows the room selections and status. The last screen shows an adjustment for the user to select what they like as another input for the enotype characterization.

Figure 42:
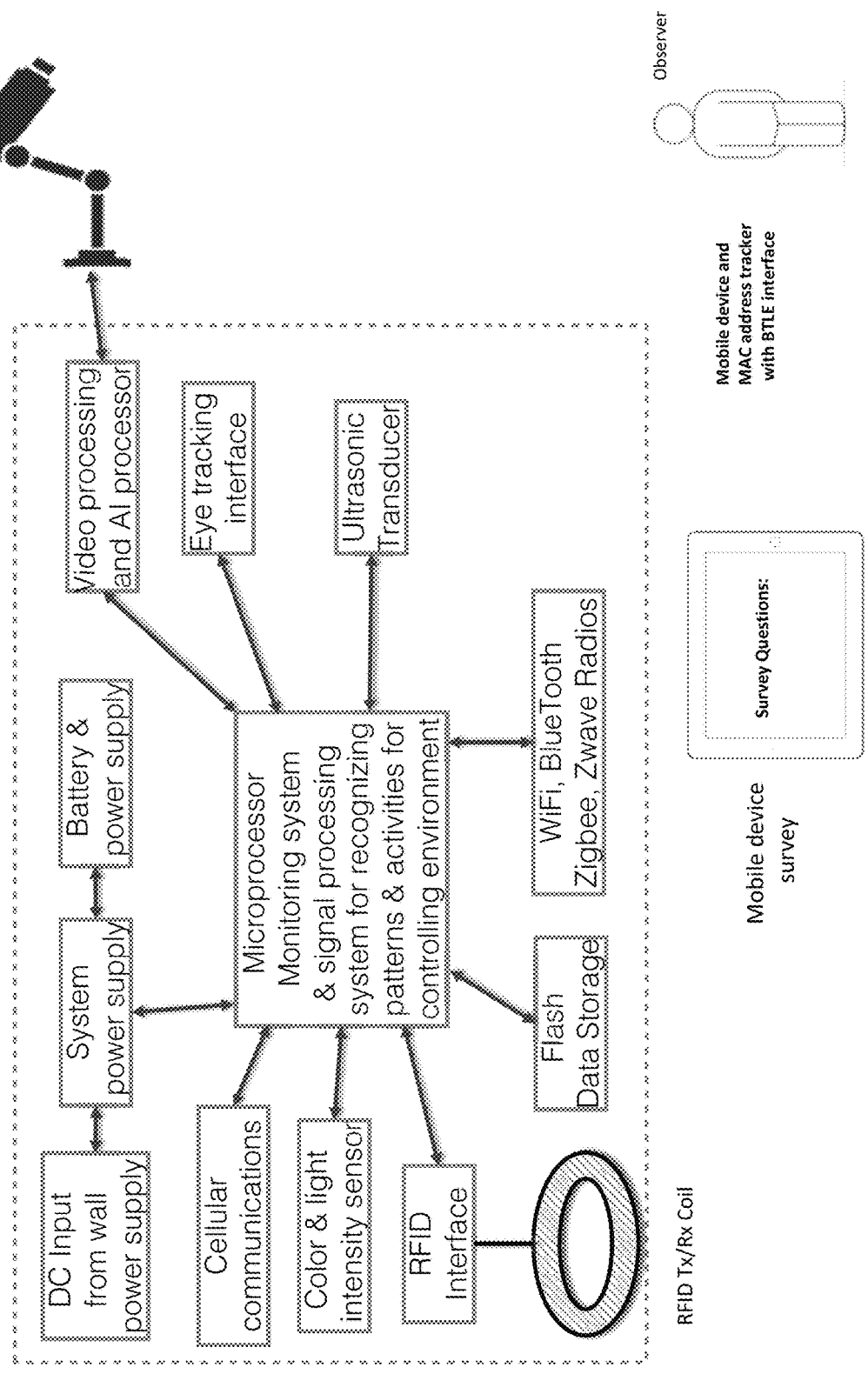
FIG. 42 illustrates a representative example dynamic control and feedback system.

FIG. 42 shows the control and feedback system for monitoring color influence. The system uses an artificial intelligence driven image capture system evaluating first impressions and ranking the changes, patterns, expressions of an individual when entering a room or looking at a specific surface or object. This device has a camera, power supply, image processing computer and a control computer. The image processing computer has the necessary capabilities to do real time processing and comparisons to set expressions and reactions and do a from to analysis on reaction for feedback. The system is designed to monitor & hold specific conditions of lighting, color shifting, intensities, sounds, and scents for a design of experiments analysis of these conditions and the respective statistical response. The cellular communications and Wi-Fi communications are to push data up to the cloud for additional analysis. The ultrasonic sensors are for ranging and watching change over distance. The system stores the room design specifications and expected temperaments.

Figure 43:
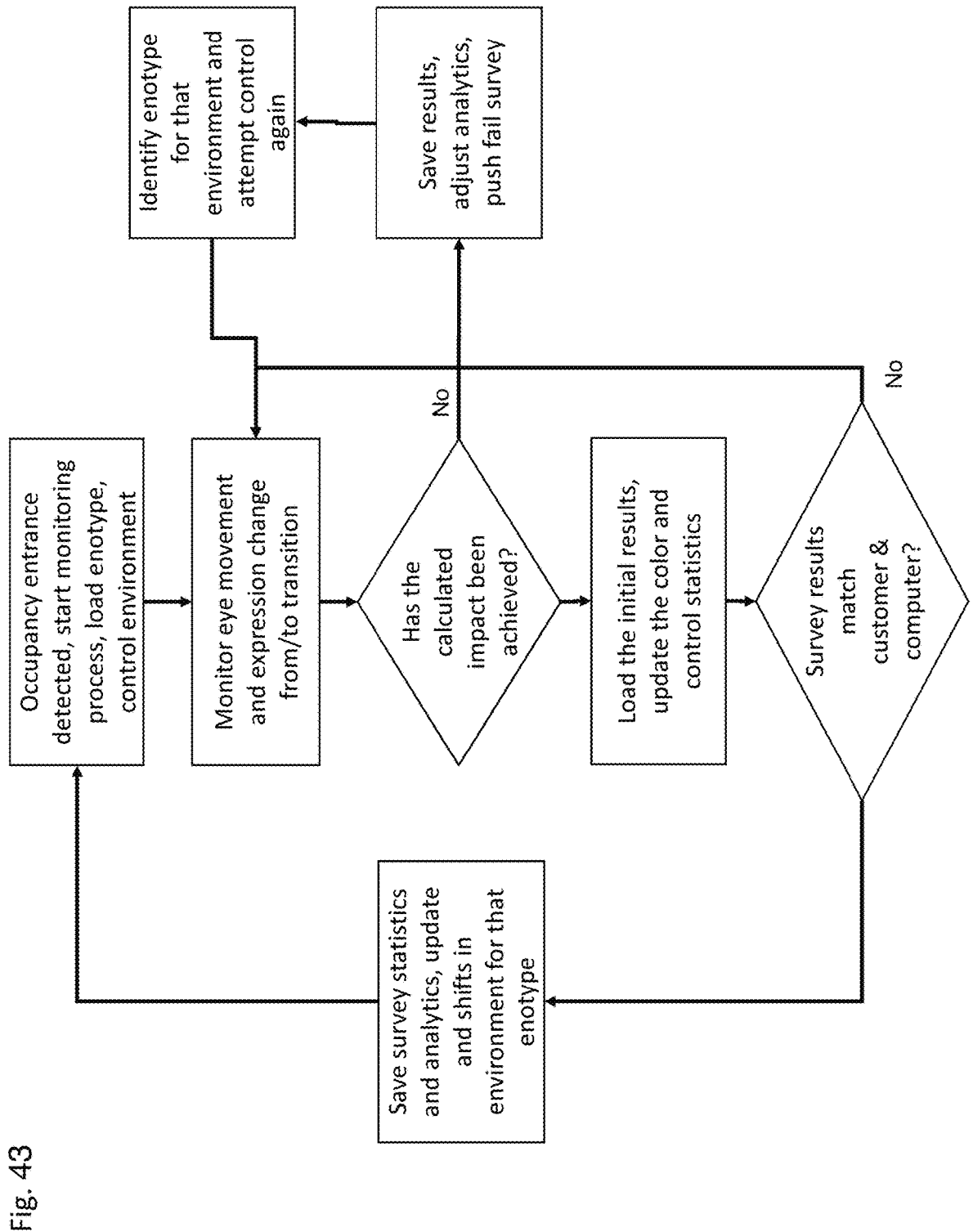
FIG. 43 illustrates an example flow diagram.

FIG. 43 shows an example of a system designed to take a user through seasons and situations that represent color shifts in natural light and angles over seasonal conditions to see the impact of color and light intensity shifting over a year. The color and light sensor is a data logger that can be taken into that environment to watch these conditions. Furthermore we can project the changes in color and shifting with your target selections in your environments. We record real data, input real images and project real expectations of resultant color and lighting. This allows us to offer lighting and control options to design a specific experience with better understanding. Meanwhile we are recording information to better understand color selection and feedback further defining the enotype definitions and characteristics as we collect additional data.

FIG. 36 shows a tool used in do-it-yourself stores to assist in color selection. This can be an online tool or an in-store tool to assist in color selection and can use all the elements of FIG. 35.

FIG. 43 walks us through the flow of the image analysis. The occupancy of a new person in the room is by RFID, Cell phone BTLE, facial recognition.

FIG. 44 shows data feedback from a control hub and control system. The surfaces are reporting specific expressions related to change and favorability.

Figure 45:
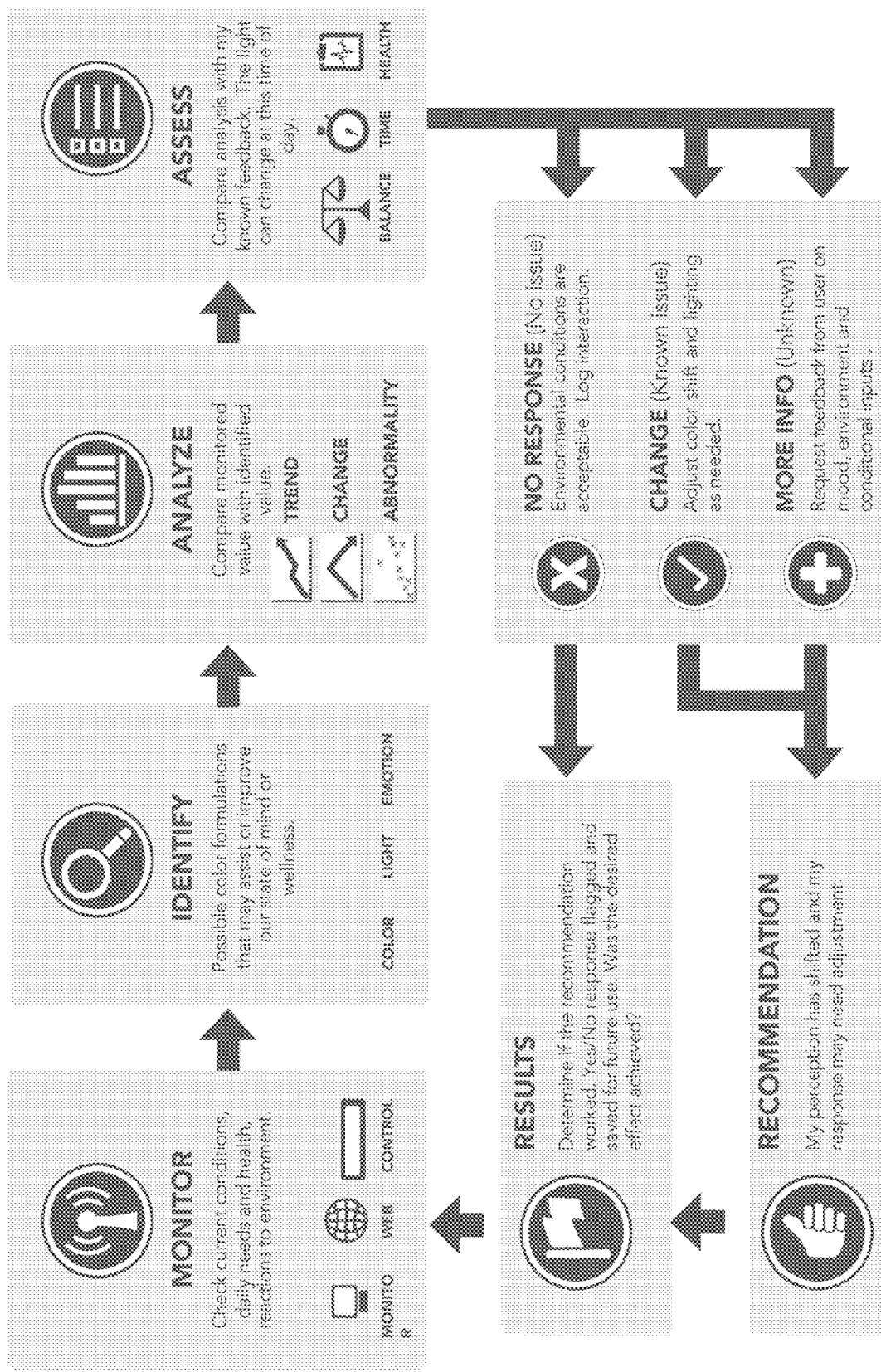
FIG. 45 illustrates an example flow diagram showing personal environmental impact.

FIG. 45 is the process to inform the status of the design and collected data as it compares to the ongoing data assimilation process. This enables feedback and ongoing learning. The trends are tracked and the changes are monitored for adding additional characteristics to the data associations and word combinations matrix.

FIG. 37 shows a system that first uses the colors of a given room storing the room ID in memory combined with the design colors storing the Color ID in memory. The system uses color and light intensity sensors to check for natural and artificial lighting color shifting. The sensors utilize spectral like the ones from AMS https://ams.com/color-sensors for the lower cost solutions and instrumentation like the Micro-Epsilon instruments https://www.micro-epsilon.com/color/colorCONTROL ACS/?sLang=us&gclid=EAIaIQobChMIx5rBqJKR3AIVFrj ACh2kyAdHEAAYAyAAEgL3SvD_BwE and for wavelength. Colorimeters or spectrometers can also be used to measure the combined effects of light, reflection and radiance. An example piece of instrumentation is from Hunter Labs https://www.hunterlab.com/blog/color-measurement-2/colorimeter-vs-spectrophotometer-knowing-the-differences-among-color-measurement-technologies/. The system is designed to add the appropriate sounds, scents and support phycology. The system is designed to process camera images from one or more surfaces with the Color ID and Room ID saved for each camera. The resultant expressions, changes in expressions and reactions are recorded as that person is looking at that surface. A mobile device application is used to request user feedback and also transmit the user enotype based on a series of questions and visual cues and images. The hub coordinates the data and is enabled for cellular and Wi-Fi communications to get the data to the cloud. And the data is collected and the sample size increases we see the capability to determine classifications of what enotypes expect in colors and environments. The control portion can be used for two distinct purposes. One is to monitor and record impact and responses. The other is to react to enotypes and control environments for the best outcome for multiple enotypes within a single environment. The control can be programmed for the scents and sounds as well and as the system learns the profile is updates and additional characteristics are changes to optimized the best reactions.

FIG. 38 shows a room with computer controlled RGB LED lighting as well as natural lighting. The sensors monitor light intensity levels for both the artificial lighting and the natural lighting. The color sensors detect the room wavelength and the Room ID and Color ID for that room or surface allow that sensor ID to be associated with that surface. The color shift is recorded as natural light changes and shifts. The camera is also designed to detect colors and shifting of colors throughout the room. The camera has software that is designed to measure the color as well and also detects the artificial and natural lighting contributions. The camera imaging is also recording facial expressions. Negative and positive expressions are calculated and added to the algorithm for supporting enotype emotive response and purpose.

FIG. 39 shows the same system design for product presentations. The system is designed so that each enotype can have a tailored environment specifically for them. Although this system shows a custom designed room it could be a point-of-sale end cap in a retail store. The solution allows for the research of colors and impact on enotypes as well as the seasonal and store lighting and its effects. The product can be researched at the store, at home and within home colors and multiple lighting configurations.

FIG. 40 the research laboratory for sensory inputs and reactions utilizes instrumentation that tracks your comfort levels, heart rate, respiration, infrared body temperature, facial recognition, eye tracking, facial expression tracking. It monitors colors and intensities within the room. The system seeks to collect data to better understand the physiological, emotional and responses to color and lighting stimuli.

FIG. 41A-41C another aspect of the research is a series of questions and visual cues that promote understanding the enotypes of the user. It also builds the facial expression recognition algorithm by confirming your response in questions. The mobile device application shows three different functions. The first is surveys for the user real time as they encounter the observation point. Second showing the responses and environmental data in real time. Allowing the control of the environment to the users preference as another way to understand the users enotype and record that additional data.

FIG. 42 shows the dynamic control and feedback system for tracking color impact and use. The system is designed to be easy to install and is a central hub for monitoring and controlling. All inputs come through this hub. The eye tracking watches eye movement. The phone application asks questions and gets physical inputs based on requests. The camper watches and measures the present stimuli while monitoring facial expressions. The color monitors and intensity data is logged along with the room ID and color ID for that response.

FIG. 35 shows a design system for color selection. The color and lighting intensity monitor is placed in each room and records the room ID and provide a recorded data logged. The color selection tool and purpose creation through temperaments enables the viewing of colors within each room. The pictures are uploaded from each room and these are played back digitally in virtual reality. The color selection is recorded and then played back with the recorded natural lighting for each room. The user can check lighting levels, colors and color shifting. This is the first color selection tool that takes the fear away from color selection by enabling users to see the outcomes in a more informative way. The virtual reality system also records the users responses and asks questions. This again this system logs responses for each enotype while enabling selection and color types.

FIG. 36 is the same system as FIG. 9 but used in a retail store environment. This can be a web application combined with in store selection.

FIG. 43 shows the algorithms input for the learning matching collecting response data. This data is associated to the words and color selections to further enhance the identity and emotive response selections and accuracy by enotype. The occupancy is detected for that room and color ID. Eye movement and facial expressions are racked as a from matrix and recorded and then a next response transition is recorded. If the calculated impact has be achieved we load the initial results and update the color control statistics. If not we can adjust the color to achieve the impact. This impact is achieved with the collaboration of the user. Once achieved we get to a selection from the user and these new adjustment are recorded.

FIG. 44 shows an example of the data recorded for each surface. The response is 0 if very negative and 10 if very positive based on facial responses. With each response we recode the color wavelengths, color sensor data, lighting intensities, room ID and color ID along with survey summary data.

FIG. 45 shows the monitoring process of identifying responses and analyzing trends, change and abnormalities.

One aspect of the present invention relates to a system and method to enable a more intentional use and understanding of color impact and outcomes. Some embodiments of this invention seek to log data about human interactions to color and outcome in the form of temperaments and environments. Some embodiments of the invention seek to use mathematical algorithms and word associations to determine purposeful outcomes and color combinations. Some embodiments of this invention relate to various ways to sense the environmental conditions, natural lighting, natural lighting colors, and intentional design color combinations or groupings in a room. Other embodiments control colors and light levels to cause specific color and lighting shifts that enhance the intended design decisions. Another embodiment turns every design into data gathering research on these selections and allows experiments to be run on these assumptions. Another embodiment creates a research environment that enables product testing and user feedback to be sensed and surveyed. Other embodiments seek to define specific enotypes that define a person by the experience stimuli and enable controls based on who is in the room or by the product. Other systems may have sensors and allow change but this poses a challenge to getting the complete understanding of color impact.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z ; and Y, Z.

The embodiments of the invention in which an exclusive property or privilege is claimed are defined as follows:

1. A method of color selection, the method comprising the steps of:
    obtaining an organization of discrete spectral colors into a plurality of different palettes where the discrete spectral colors for each palette are interrelated by at least one of a plurality of different temperaments, wherein each of the plurality of different temperaments are indicative of the related characteristics among the discrete spectral colors for that palette;
    creating correlations between descriptive words and the plurality of different temperaments by:
        processing a corpus of images and associated text along with pre-determined correlations between the plurality of different temperaments and the plurality of different palettes of colors; and
        processing the associated text to identify descriptive words and correlating those descriptive words with a temperament based on the similarity or dissimilarity between colors from the corpus of images and colors from the palette of interrelated colors with that temperament;
    correlating a plurality of physiological responses with the plurality of different temperaments based on the correlations between descriptive words and the plurality of different temperaments;
    receiving a desired physiological response from a user;
    identifying one or more of the plurality of different temperaments based on (1) correlations between the plurality of physiological responses and the plurality of different temperaments and (2) the desired physiological response; and
    providing, to the user, the identified one or more of the plurality of different temperaments.

2. The method of claim 1 wherein correlating the plurality of physiological responses further comprises the step of creating statistical associations based on processing a corpus of images and associated text.

3. The method of claim 1 wherein providing, to the user, the identified one or more of the plurality of different temperaments further comprises the step of facilitating selection of one or more colors that provide the desired physiological response.

4. The method of claim 1, wherein correlating the plurality of physiological responses with the plurality of different temperaments further comprises the step of creating statistical associations based on survey data.

5. The method of claim 1, wherein:
    obtaining the organization of discrete spectral colors further comprises the step of obtaining the organization of discrete spectral colors into a plurality of different palettes where the discrete spectral colors for each palette are interrelated by at least one of the plurality of different temperaments or a plurality of different environments, wherein each of the plurality of different environments are indicative of the related characteristics among the discrete spectral colors for that palette; and
    correlating a plurality of physiological responses further comprises the step of correlating a plurality of physiological responses with the plurality of different environments.

6. The method of claim 5, further comprising the step of identifying one or more of the plurality of different environments based on (1) correlations between the plurality of physiological responses and the plurality of different environments and (2) the desired physiological response.

7. A method of auditing color of an image, the method comprising the steps of:
    obtaining an organization of discrete spectral colors into a plurality of different palettes where the discrete spectral colors for each palette are interrelated by at least one of a plurality of different temperaments, wherein each of the plurality of different temperaments are indicative of the related characteristics among the discrete spectral colors for that palette;
    receiving an image from a user;
    selecting one or more colors based on one or more pixels of the image;
    comparing discrete spectral colors in the plurality of different palettes interrelated by at least one of the plurality of different temperaments to the selected one or more colors;
    identifying one or more of the plurality of different temperaments based on the comparison; and
    providing, to the user, the identified one or more of the plurality of different temperaments, along with a percentage of each temperament in the image based on the percentage of color values of pixels in the image.

8. The method of claim 7, further comprising the step of correlating a plurality of physiological responses with the plurality of different temperaments by creating statistical associations based on survey data.

9. The method of claim 7, further comprising the step of correlating a plurality of physiological responses with the plurality of different temperaments by creating statistical associations based on processing a corpus of images and associated text.

10. The method of claim 7, wherein:
    obtaining the organization of discrete spectral colors further comprises the step of obtaining the organization of discrete spectral colors into a plurality of different palettes where the discrete spectral colors for each palette are interrelated by at least one of the plurality of different temperaments or a plurality of different environments, wherein each of the plurality of different environments are indicative of the related characteristics among the discrete spectral colors for that palette.

11. The method of claim 10, further comprising the step of identifying one or more of the plurality of different environments based on the comparison.

12. A method comprising the steps of:
obtaining an organization of discrete spectral colors into a plurality of different palettes where the discrete spectral colors for each palette are interrelated by at least one of a plurality of different temperaments, wherein each of the plurality of different temperaments are indicative of the related characteristics among the discrete spectral colors for that palette;
receiving an image from a user for temperament auditing;
processing the image into a plurality of pixels;
determining a set of one or more common colors in the image by analyzing the plurality of pixels;
determining which temperament colors are closest to the set of one or more common colors in the image by a distance calculation;
identifying one or more of the plurality of different temperaments based on the temperament colors that are closest to the set of one or more common colors in the image; and
providing, to the user, the identified one or more of the plurality of different temperaments.

13. A method comprising the steps of:
obtaining an organization of discrete spectral colors into a plurality of different palettes where the discrete spectral colors for each palette are interrelated by at least one of a plurality of different temperaments, wherein each of the plurality of different temperaments are indicative of the related characteristics among the discrete spectral colors for that palette;
receiving an image from a user for temperament auditing;
identifying one or more of the plurality of different temperaments based on the image; and
providing, to the user, the identified one or more of the plurality of different temperaments, along with a percentage of each temperament in the image.

* * * * *